(12) United States Patent
Voltz, III et al.

(10) Patent No.: US 8,577,792 B2
(45) Date of Patent: Nov. 5, 2013

(54) FORECLOSURE PREVENTION AND PROTECTION

(75) Inventors: Allan S. Voltz, III, Browns Summit, NC (US); Eric H. Choltus, Charlotte, NC (US); Jason S. Cashwell, Greensboro, NC (US); Robert M. Mauldin, III, Charlotte, NC (US); Robert H. Eshleman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 250 days.

(21) Appl. No.: 12/831,980

(22) Filed: Jul. 7, 2010

(65) Prior Publication Data

US 2010/0293092 A1    Nov. 18, 2010

Related U.S. Application Data

(63) Continuation-in-part of application No. 10/710,206, filed on Jun. 25, 2004, and a continuation-in-part of application No. 12/350,225, filed on Jan. 7, 2009.

(60) Provisional application No. 61/320,201, filed on Apr. 1, 2010.

(51) Int. Cl.
*G06Q 40/00* (2012.01)
*G06Q 40/02* (2012.01)

(52) U.S. Cl.
CPC .............. *G06Q 40/00* (2013.01); *G06Q 40/02* (2013.01); *G06Q 40/025* (2013.01)
USPC .................................... 705/38; 705/4; 705/35

(58) Field of Classification Search
CPC ...... G06Q 40/00; G06Q 40/02; G06Q 40/025
USPC .................................................. 705/38, 4, 35
See application file for complete search history.

(56) References Cited

U.S. PATENT DOCUMENTS 4,876,648 A   10/1989   Lloyd
5,655,085 A   8/1997    Ryan et al.
(Continued)

OTHER PUBLICATIONS

Keith, A. D. (2002). Goodbye, credit life. hello, debt cancellation? American Bankers Association.ABA Banking Journal, 94(6), 64-67. Retrieved Nov. 2, 2012.*

(Continued)

*Primary Examiner* — Kito R Robinson
(74) *Attorney, Agent, or Firm* — Michael A. Springs; Moore & Van Allen PLLC; Esther F. Queen

(57) ABSTRACT

A method for process monitoring is disclosed. A borrower is offered a proceeding in which a secured party has executed on collateral due to nonpayment prevention and protection plan associated with a secured loan. A periodic payment is received from the borrower in response to the borrower accepting the proceeding in which a secured party has executed on collateral due to nonpayment prevention and protection plan. The proceeding in which a secured party has executed on collateral due to nonpayment prevention and protection plan allows for at least a portion of a loan payment for the secured loan to be covered by a proceeding in which a secured party has executed on collateral due to nonpayment prevention and protection (PP) entity on behalf of the borrower in response to a covered event occurring. The proceeding in which a secured party has executed on collateral due to nonpayment prevention and protection plan additionally may allow for paying/cancelling the debt's investor in response to loss of the property by the borrower.

27 Claims, 22 Drawing Sheets

(56) References Cited

U.S. PATENT DOCUMENTS

| | | | |
|---|---|---|---|
| 5,907,828 A | 5/1999 | Meyer et al. | |
| 6,009,402 A | 12/1999 | Whitworth | |
| 6,315,196 B1 | 11/2001 | Bachman | |
| 7,182,253 B1 | 2/2007 | Long | |
| 7,440,926 B2 | 10/2008 | Harrington | |
| 7,941,355 B1 * | 5/2011 | DeLoach | 705/35 |
| 2004/0128233 A1 | 7/2004 | Jarzmik | |
| 2004/0186808 A1 | 9/2004 | Coughlin | |
| 2004/0254878 A1 * | 12/2004 | Fitzsimmons et al. | 705/38 |
| 2005/0060206 A1 | 3/2005 | Mitchell | |
| 2005/0108028 A1 | 5/2005 | Arehart | |
| 2005/0108064 A1 | 5/2005 | Castleman et al. | |
| 2005/0203832 A1 * | 9/2005 | Prieston | 705/38 |
| 2006/0074800 A1 | 4/2006 | Mitchell | |
| 2006/0155590 A1 | 7/2006 | Graham | |
| 2007/0094127 A1 * | 4/2007 | Izyayev | 705/38 |
| 2007/0239493 A1 | 10/2007 | Sweetland et al. | |
| 2007/0265960 A1 * | 11/2007 | Advani et al. | 705/38 |
| 2009/0132298 A1 * | 5/2009 | Benward et al. | 705/4 |
| 2009/0216591 A1 | 8/2009 | Buerger et al. | |
| 2010/0023354 A1 | 1/2010 | Gore et al. | |
| 2010/0100400 A1 | 4/2010 | Becerra | |
| 2010/0114743 A1 | 5/2010 | Misraje et al. | |
| 2010/0274593 A1 | 10/2010 | Dreher | |

OTHER PUBLICATIONS

Company Brings Together the Advantages of Capital Markets, Social Networking and Traditional Banking (2009). Business Wire. Rretrieved Jul. 30, 2013.*

Wallace, Mike (May 5, 2008). House Committee passes bill for new FHA program; final piece of housing stabilization legislation. Nation's Cities Weekly, 31, 18, 1(2). Retrieved Jul. 30, 2013.*

Jannarone, J.P., (May 30-31, 2002). Debt Protection Product Development in the Aftermath of Gramm-Leach-Bliley. vol. 28, No. 1.

www.csc.com. Debt Protection Program. Computer Sciences Corporation. Copyright 2001. Retrieved Feb. 2008. Archived Jun. 20, 2003.

www.bankofamerica.com. Bank of America Cardholder Security Plan. Retrieved Feb. 2008. Archived Jun. 20, 2003.

Anonymous. Debt Cancellation Program Endorsed. American Bankers Association. ABA Banking Journal. New York: May 2003. vol. 95, Iss. 5; p. 13, 2 pgs.

Dymi, Amilda. WaMu Centralizes Community Outreach. National Mortgage News. NY May 26, 2003. vol. 27, Iss. 35; p. 18.

Bill Lambrecht Post Dispatch Washington Bureau The Associated Press Contributed Information For, This Story. (Feb. 28, 1996). Gephard proposes worker protections he would penalize firms for mass layoffs. St. Louis Post—Dispatch (Pre-1997 Fulltext). Retrieved Oct. 18, 2012.

Yang, J. E. (Feb. 28, 1996). Hill picks up buchanans's economic anxiety issue. The Washington Post (Pree-1997 Fulltext). Retrieved Oct. 18, 2012.

David Reich-Hale. (Oct. 20, 2003). B of A: Debt Cancellation Product Equals Credit Life. American Banker, p. 19. Retrieved Mar. 20, 2012.

Rob Reilley. (Oct. 2001). Debt cancellation: the preferred alternative to credit insurance. ABA Banking Journal, V93, n10, p. 74(4), Retrieved Mar. 20, 2012.

* cited by examiner

Income Curtailment Benefit Calculator

| | | | FER |
|---|---|---|---|
| Details Determined At Application | Borrower's Periodic Payments | $1,300 | 26.0% |
| | Borrower's Periodic Income | $5,000 | |
| Result of Income Curtailment (IC) | Borrower's Periodic Payments | $1,300 | 32.5% |
| | Borrower's Reduced Periodic Income | $4,000 | |
| | Income Reduction | 20.0% | |
| Borrower's Adjusted Periodic Payment Amount | Borrower's New Periodic Payment while Under IC | $1,300 | |
| | Borrower's Reduced Periodic Income | $4,000 | |
| PP Payment made on behalf of Borrower | | Not Eligible | |
| Borrower's required Payment | | $1,300 | |
| | Payment Reduction | 0.0% | |

*FIG. 16A*

| Income Curtailment Benefit Calculator | | | FER |
|---|---|---|---|
| Details Determined At Application | Borrower's Periodic Payments | $1,300 | 26.0% |
| | Borrower's Periodic Income | $5,000 | |
| Result of Income Curtailment (IC) | Borrower's Periodic Payments | $1,300 | 52.0% |
| | Borrower's Reduced Periodic Income | $2,500 | |
| | Income Reduction | 50.0% | |
| Borrower's Adjusted Periodic Payment Amount | Borrower's New Periodic Payment while Under IC | $775 | 31.0% |
| | Borrower's Reduced Periodic Income | $2,500 | |
| PP Payment made on behalf of Borrower | | $525 | |
| Borrower's Reduced Payment | | $775 | |
| | Payment Reduction | 40.4% | |
| Servicer still receives full amount under IC | | $1,300 | |

FIG. 16B

| Income Curtailment Benefit Calculator | | | |
|---|---|---|---|
| | | | FER |
| Details Determined At Application | Borrower's Periodic Payments | $1,300 | 26.0% |
| | Borrower's Periodic Income | $5,000 | |
| Result of Income Curtailment (IC) | Borrower's Periodic Payments | $1,300 | 52.0% |
| | Borrower's Reduced Periodic Income | $2,500 | |
| | Income Reduction | 50.0% | |
| Borrower's Adjusted Periodic Payment Amount | Borrower's New Periodic Payment while Under IC | $775 | 31.0% |
| | Borrower's Reduced Periodic Income | $2,500 | |
| PP Payment made on behalf of Borrower | | $525 | |
| Borrower's Reduced Payment | | $600 | |
| | Payment Reduction | 53.8% | |
| Servicer receives minimum amount under IC | | $1,125 | |

*FIG. 16C*

| Income Curtailment Benefit Calculator | | |
|---|---|---|
| Determined at Time of Application | Total Payment Due on Loan | $1,300 |
| | Borrower's Periodic Income | $5,000 |
| Result of Income Curtailment (IC) | Borrower's Reduced Periodic Income | $2,500 |
| | Income Reduction | 50.0% |
| Borrower's Adjusted Periodic Payment Amount | Payment on Loan Due for Borrower | $650 |
| | PP Entity pays Portion of Loan Payment | $650 |
| | Reduction of Borrower's Payment | 50.0% |
| Investor receives payment | | $1,300 |

*FIG. 16D*

FORECLOSURE PREVENTION AND PROTECTION

CROSS-REFERENCE TO RELATED APPLICATIONS

This application claims the benefit of priority of U.S. Provisional Patent Application No. 61/320,201 filed on Apr. 1, 2010 and entitled "Foreclosure Prevention and Protection," the entire contents of which are incorporated herein by reference. This application also claims priority, as a continuation-in-part, from co-pending U.S. patent application Ser. No. 10/710,206, filed Jun. 25, 2004, the entire disclosure of which is incorporated herein by reference, and as a continuation-in-part, from co-pending U.S. patent application Ser. No. 12/350,225, filed Jan. 7, 2009, the entire disclosure of which is incorporated herein by reference

FIELD

Embodiments of the present invention relate to mortgages, financing or debt instruments and more particularly to methods and systems for proceedings in which a secured party has executed on collateral due to nonpayment prevention and/or protection.

BACKGROUND

Sometimes, unforeseen events, such as hospitalization, disability, involuntary unemployment, bankruptcy, accidental death, and the like, can cause a borrower to be unable to make one or more debt service payments and, in the case of a mortgage, force the borrower to lose his or her property. A proceeding in which a secured party has executed on collateral due to nonpayment is, of course, usually undesirable for the borrower because the borrower loses possession of his or her home, and the borrower's credit rating can be severely impacted. Many of the unforeseen events that can cause a borrower to miss debt service payments are only temporary. Unfortunately, however, this proceeding in which a secured party has executed on collateral due to nonpayment can often result before the borrower has a chance to recover from these temporary unforeseen events.

SUMMARY

Embodiments of the invention can provide a solution to the above-described problem and/or other problems by providing methods, systems, and computer program products for implementing a proceeding in which a secured party has executed on collateral due to nonpayment prevention and protection (PP) plan. The proceeding in which a secured party has executed on collateral due to nonpayment prevention and protection plan allows an entity to cover (i.e., pay, postpone, waive or cancel) at least a portion of the borrower's payments in the event of a covered event. For example, while the proceeding in which a secured party has executed on collateral due to nonpayment prevention and protection plan is active, the entity could make the borrower's monthly mortgage payments on behalf of the borrower for a predetermined time period in response to a covered event occurring. Periodic payments may be collected for the proceeding in which a secured party has executed on collateral due to nonpayment prevention and protection plan to remain active.

According to some embodiments of the invention, the proceeding in which a secured party has executed on collateral due to nonpayment prevention and protection plan not only may protect the borrower to help prevent a proceeding in which a secured party has executed on collateral due to nonpayment, but also may protect the investor in the event of an occurrence of a proceeding in which a secured party has executed on collateral due to nonpayment since the PP entity (or a "Borrower's Protection Entity") pays any balance remaining on the loan/mortgage to the investor in response to the borrower losing his home (e.g., proceedings in which a secured party has executed on collateral due to nonpayment, bank taking possession of the property, bank-forced sale, etc.).

In accordance with some embodiments, a method for process monitoring is disclosed. A borrower is offered a proceeding in which a secured party has executed on collateral due to nonpayment prevention and protection plan associated with a secured loan. A periodic payment is received from the borrower in response to the borrower accepting the proceeding in which a secured party has executed on collateral due to nonpayment prevention and protection plan. The proceeding in which a secured party has executed on collateral due to nonpayment prevention and protection plan allows for at least a portion of a loan payment for the secured loan to be covered by a proceeding in which a secured party has executed on collateral due to nonpayment prevention and protection (PP) entity on behalf of the borrower in response to a covered event occurring. In the event of an occurrence of a proceeding in which a secured party has executed on collateral due to nonpayment of the borrower's property, the PP entity may pay at least a portion of debt remaining on the secured loan to an investor.

In accordance with some embodiments, another method for process monitoring is disclosed by enrolling a borrower into a proceeding in which a secured party has executed on collateral due to nonpayment prevention and protection plan associated with a secured loan, determining if a covered event has occurred, and covering, by an entity other than the borrower, at least a portion of a periodic payment required by the secured loan on behalf of the borrower in response to determining that the covered event has occurred in order to prevent the borrower from failing to meet the terms on the secured loan. In the event of failure to meet the terms_on the loan and/or proceedings in which a secured party has executed on collateral due to nonpayment of the borrower's property, at least a portion of debt remaining on the secured loan is paid to an investor on the loan.

In accordance with some other embodiments, an apparatus for process monitoring is disclosed. The apparatus includes a processor. The processor is configured to enroll a borrower in a proceeding in which a secured party has executed on collateral due to nonpayment prevention and protection plan associated with a secured loan, wherein the secured loan comprises a loan that is secured with property owned by a borrower. The processor is further configured to receive, by a servicer, a periodic payment from the borrower in response to enrolling the borrower into the proceeding in which a secured party has executed on collateral due to nonpayment prevention and protection plan. The proceeding in which a secured party has executed on collateral due to nonpayment prevention and protection plan allows for at least a portion of a loan payment required by the secured loan to be covered by a proceeding in which a secured party has executed on collateral due to nonpayment prevention and protection (PP) entity on behalf of the borrower in response to a covered event occurring in order to prevent the borrower from failing to meet the terms on the secured loan. In the event of failure to meet the terms on the loan and/or proceeding in which a secured party has executed on collateral due to nonpayment, at least a portion of debt remaining on the secured loan may be paid to an investor on the loan.

In accordance with some other embodiments, a computer program product for process monitoring is disclosed. The computer program product includes a non-transitory computer readable medium, wherein the non-transitory computer readable medium includes computer-executable program code stored therein. The computer-executable program code is configured to perform a method, where the method includes enrolling to a borrower a proceeding in which a secured party has executed on collateral due to nonpayment prevention and protection plan associated with a secured loan. The method further includes receiving a periodic payment from the borrower in response to enrolling the borrower into the proceeding in which a secured party has executed on collateral due to nonpayment prevention and protection plan. The proceeding in which a secured party has executed on collateral due to nonpayment prevention and protection plan allows for at least a portion of a loan payment required by the secured loan to be covered by a proceeding in which a secured party has executed on collateral due to nonpayment prevention and protection (PP) entity on behalf of the borrower in response to a covered event occurring in order to prevent the borrower from failing to meet the terms_on the secured loan.

Other aspects and features of the present invention, as defined by the claims, will become apparent to those skilled in the art upon review of the following non-limited detailed description of the invention in conjunction with the accompanying figures.

BRIEF DESCRIPTION OF DRAWINGS

Figure 1:
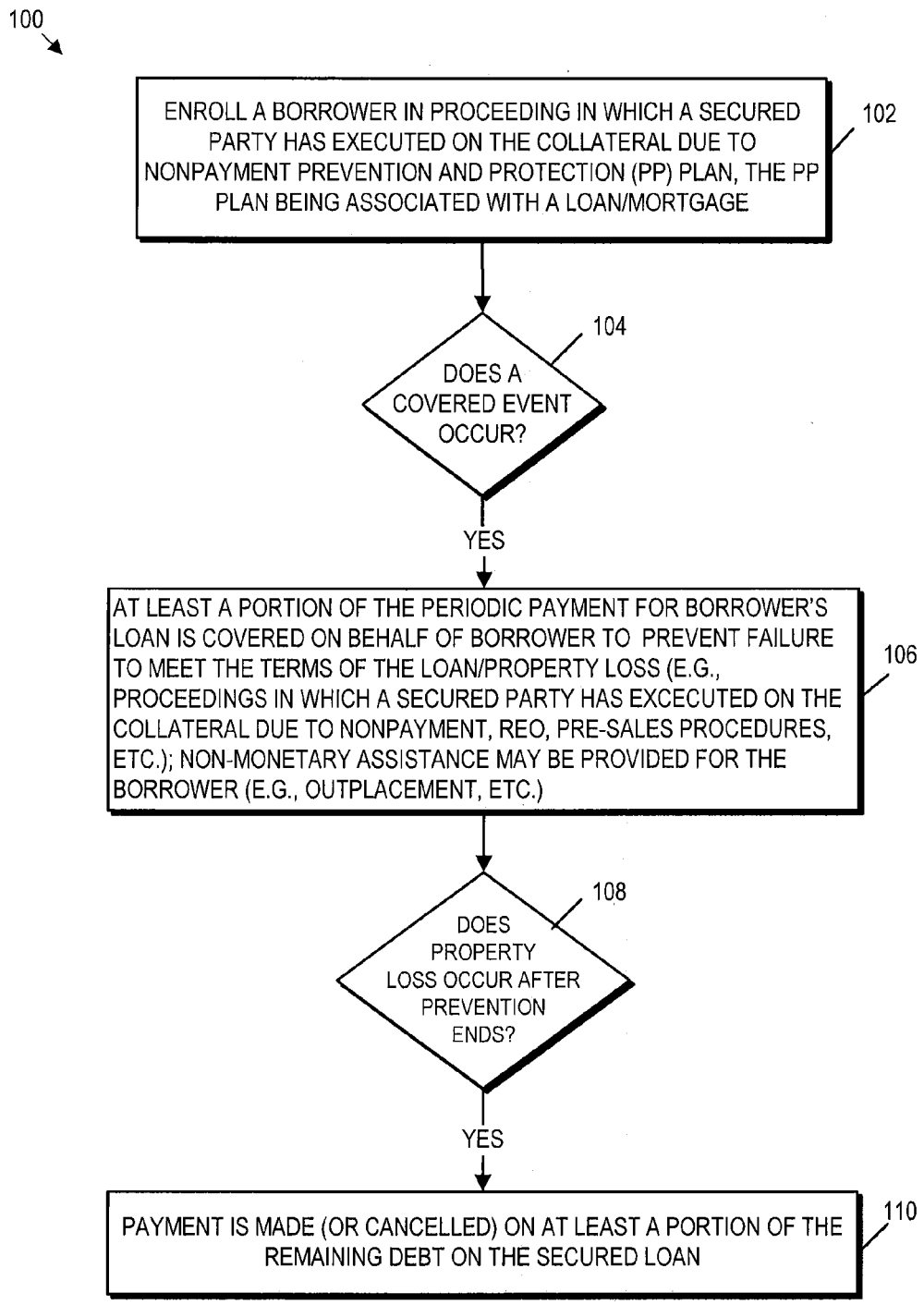

Having thus described embodiments of the invention in general terms, reference will now be made the accompanying drawings, wherein:

FIG. 1 is a flow chart of a method for a proceeding in which a secured party has executed on collateral due to nonpayment prevention and protection plan in accordance with an embodiment of the present invention.

Figure 2:
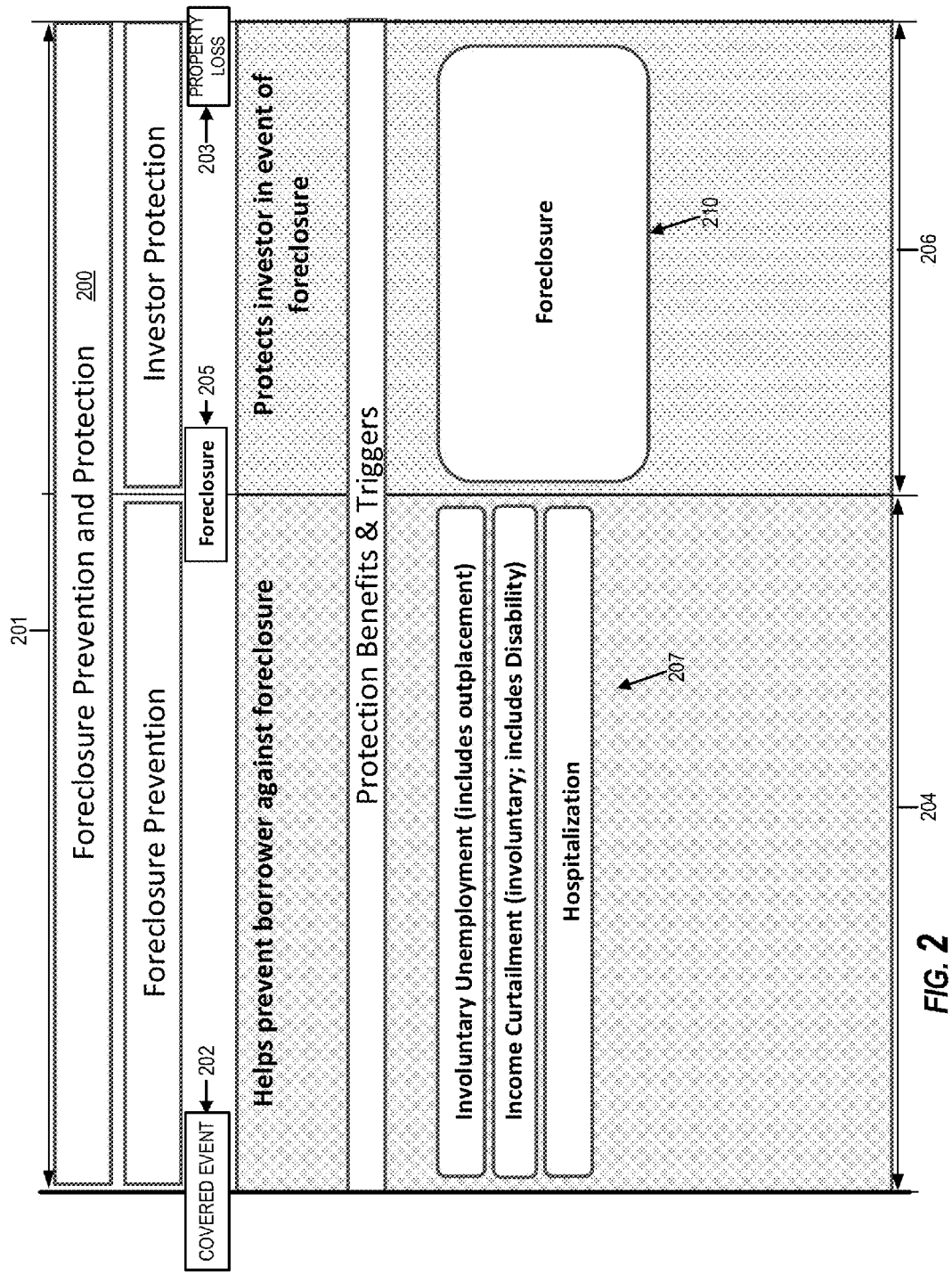

FIG. 2 is a block diagram of a proceeding in which a secured party has executed on collateral due to nonpayment prevention and protection plan in accordance with an embodiment of the present invention.

Figure 3:
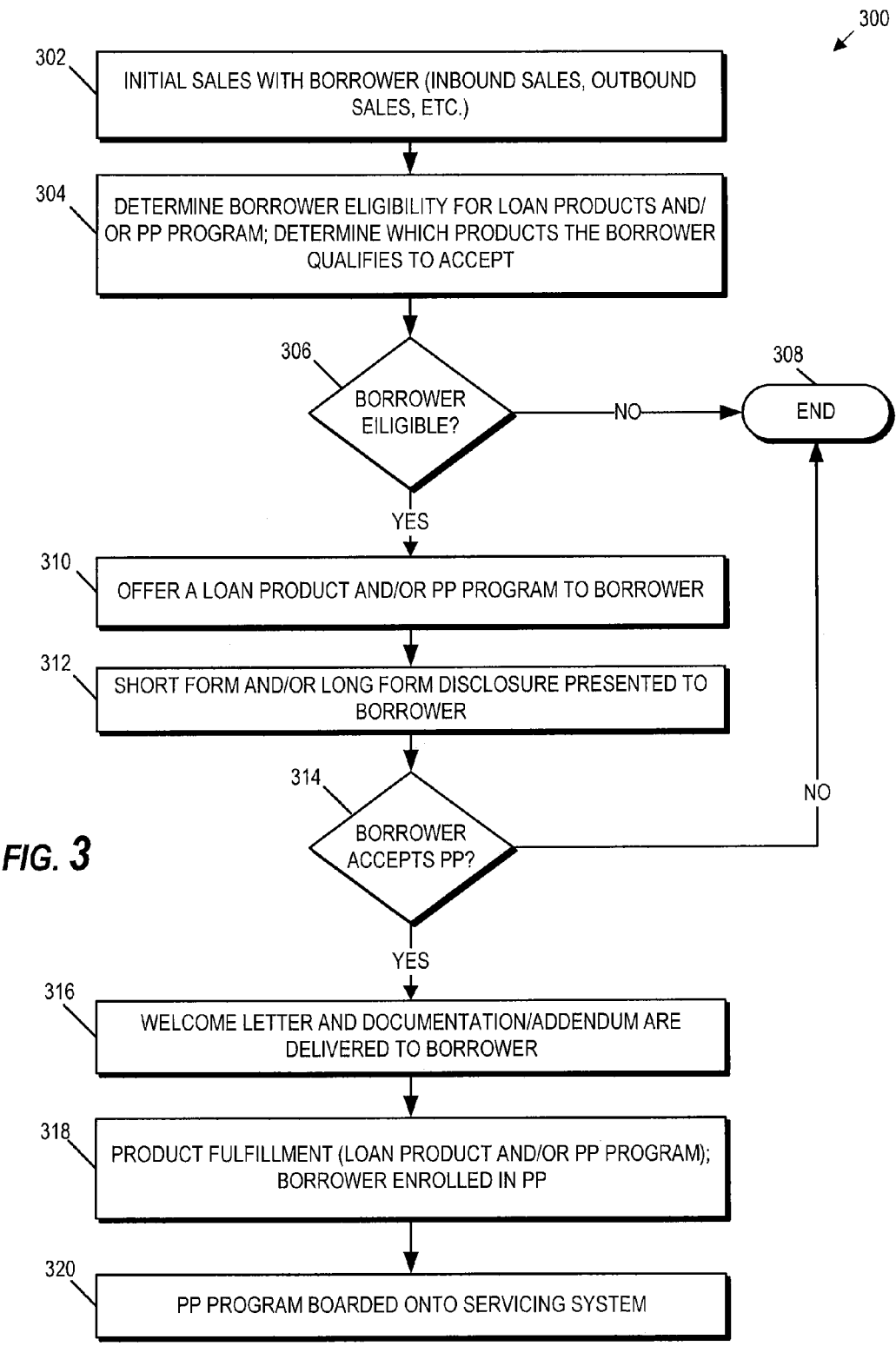

FIG. 3 is a flow chart of a method for a front-end portion of a proceeding in which a secured party has executed on collateral due to nonpayment prevention and protection plan in accordance with an embodiment of the present invention.

Figure 4A:
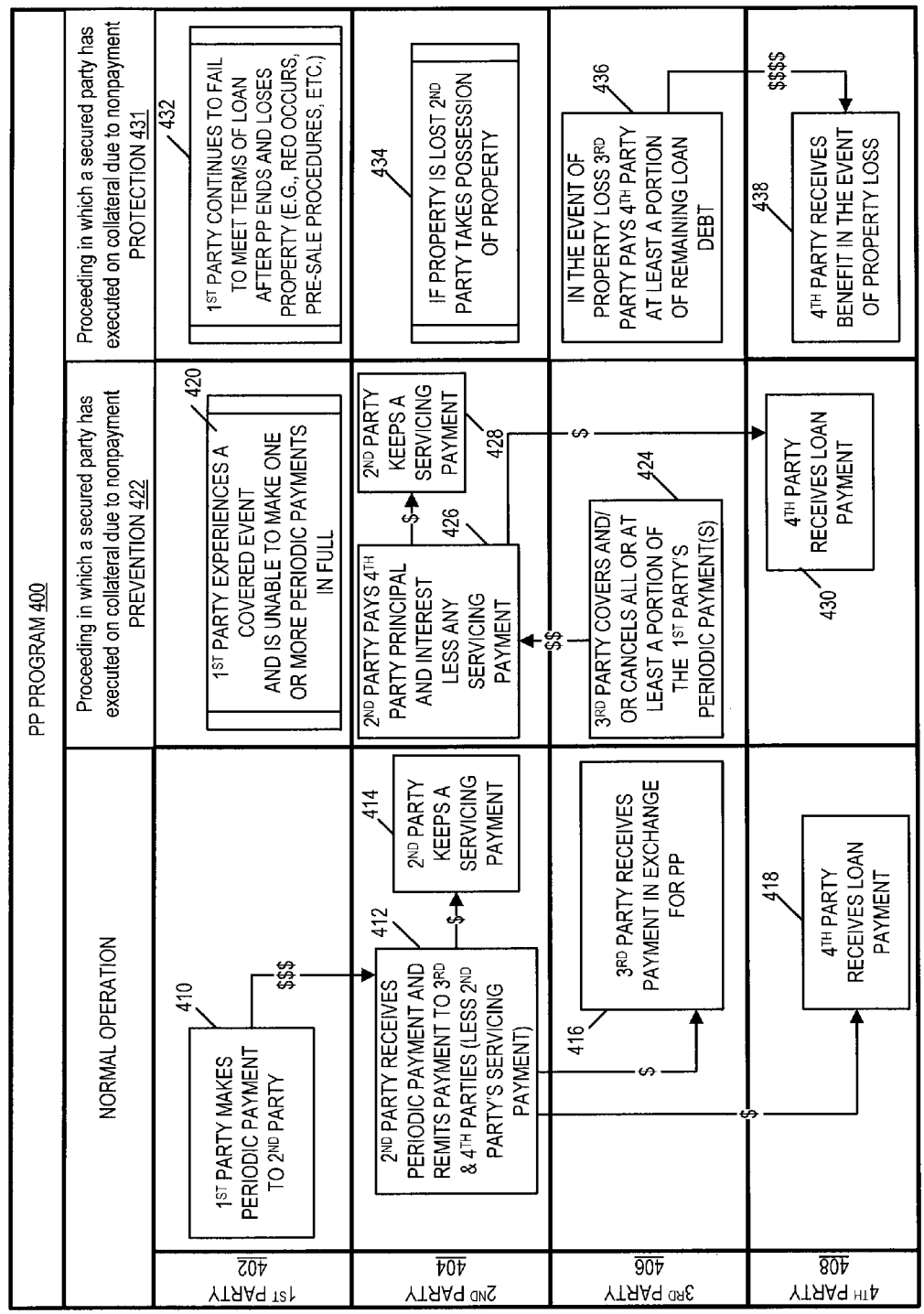

FIG. 4A is a flow chart of a method for a proceeding in which a secured party has executed on collateral due to nonpayment prevention and protection plan in accordance with another embodiment of the present invention.

Figure 4B:
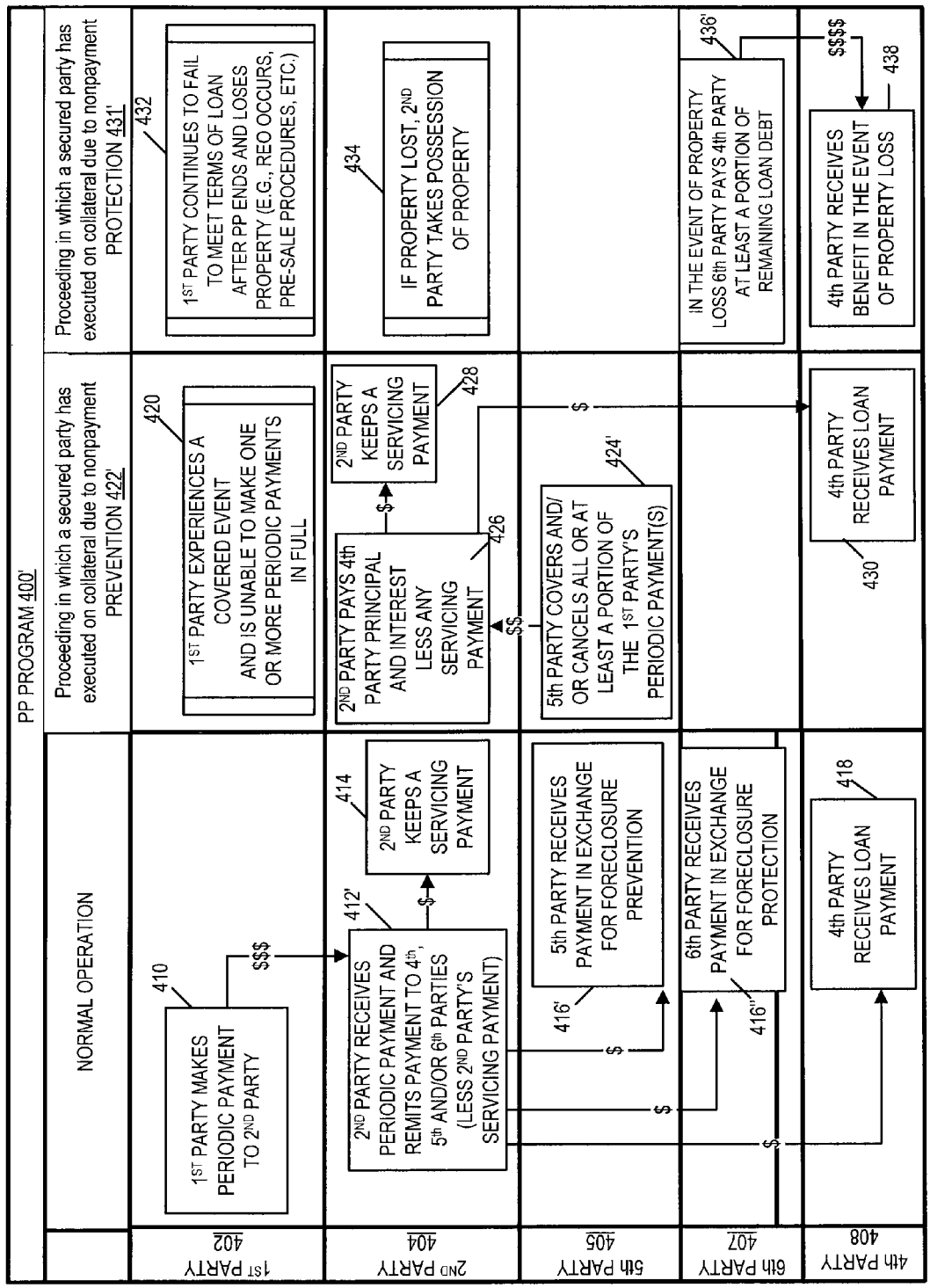

FIG. 4B is a flow chart of a method for a proceeding in which a secured party has executed on collateral due to nonpayment prevention and protection plan in accordance with yet another embodiment of the present invention.

Figure 5:
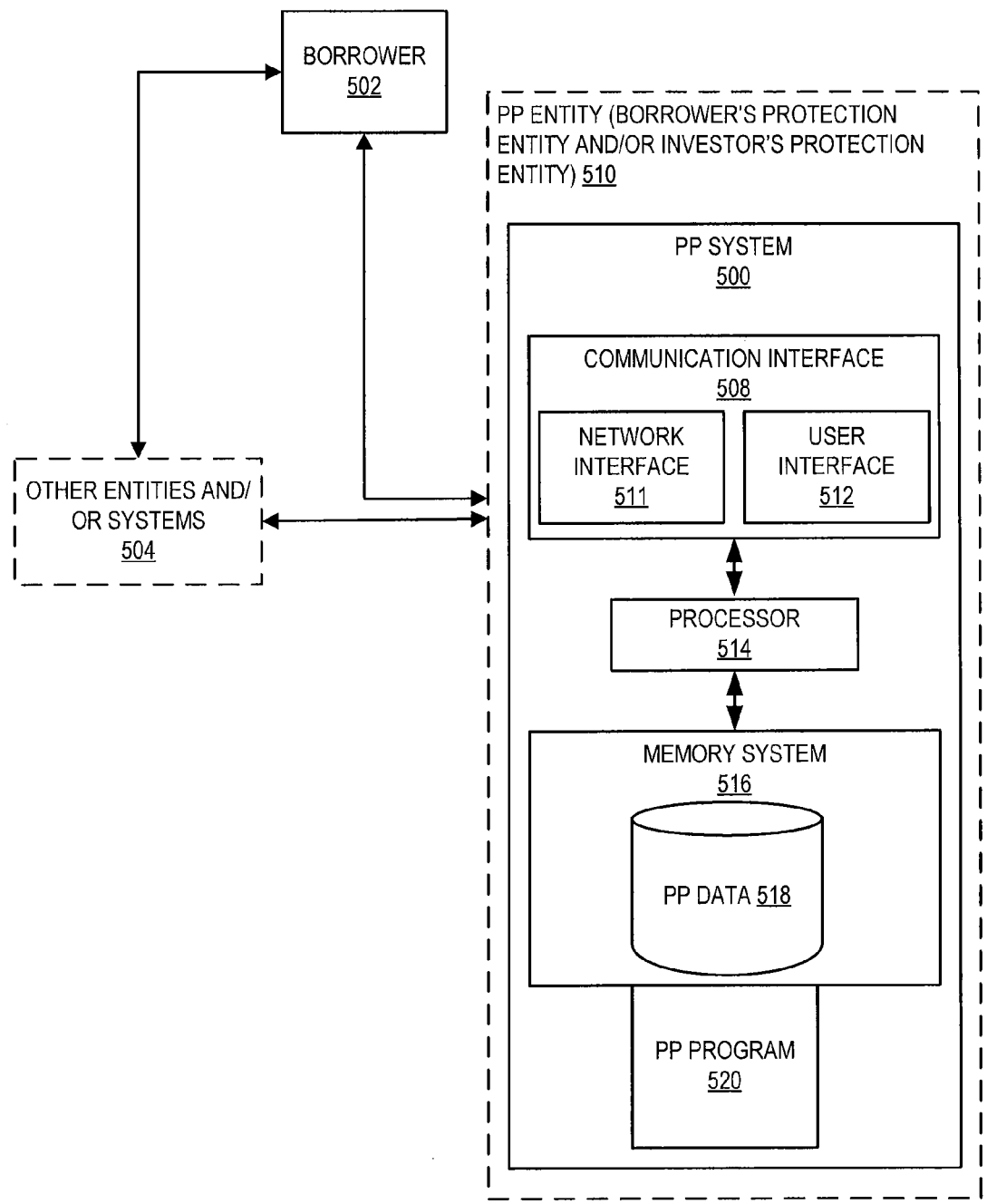

FIG. 5 is a block schematic diagram of an example of a system for a proceeding in which a secured party has executed on collateral due to nonpayment prevention and protection plan in accordance with an embodiment of the present invention.

Figure 6:
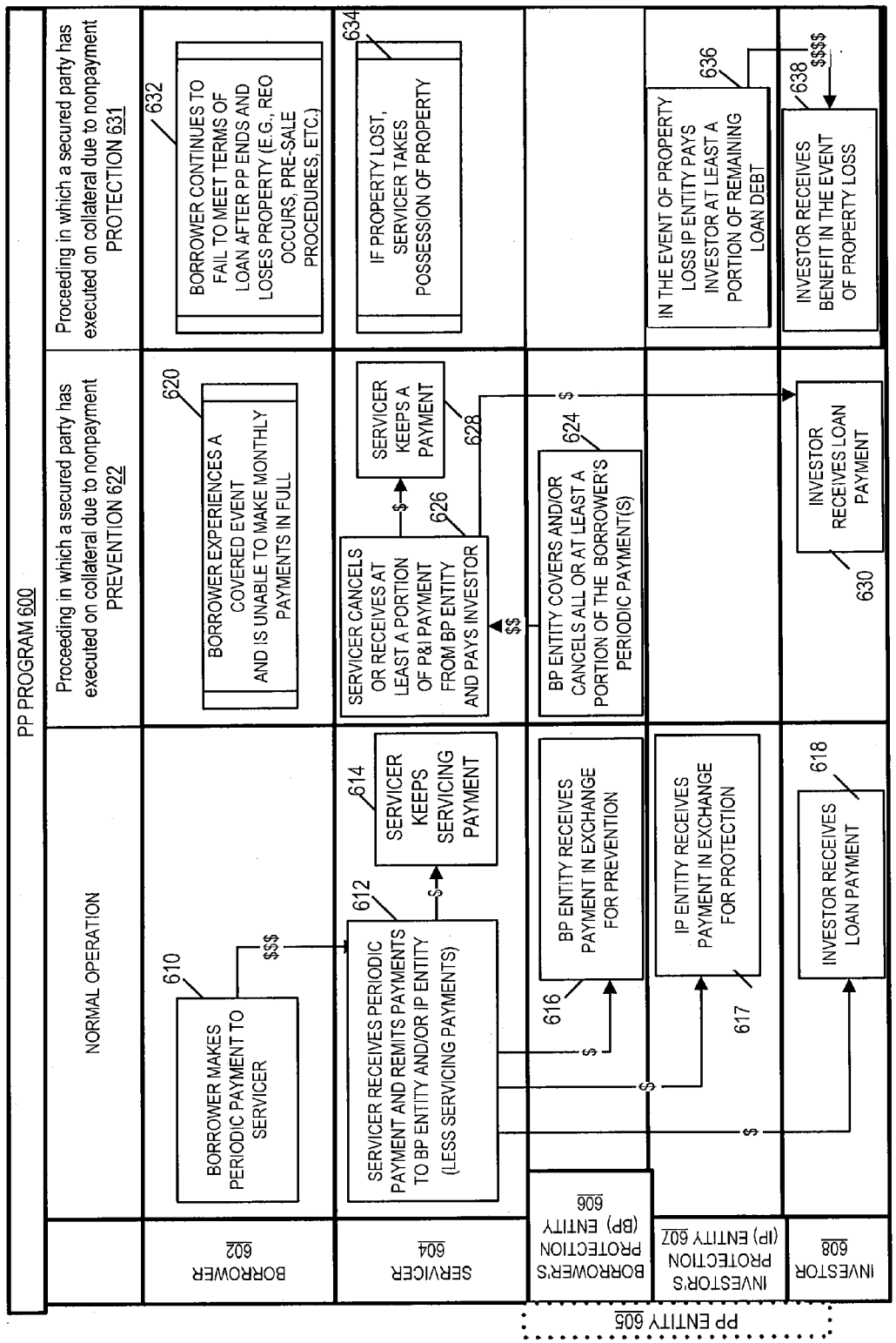

FIG. 6 is a flow chart of a method for a proceeding in which a secured party has executed on collateral due to nonpayment prevention and protection plan in accordance with another embodiment of the present invention.

Figure 7:
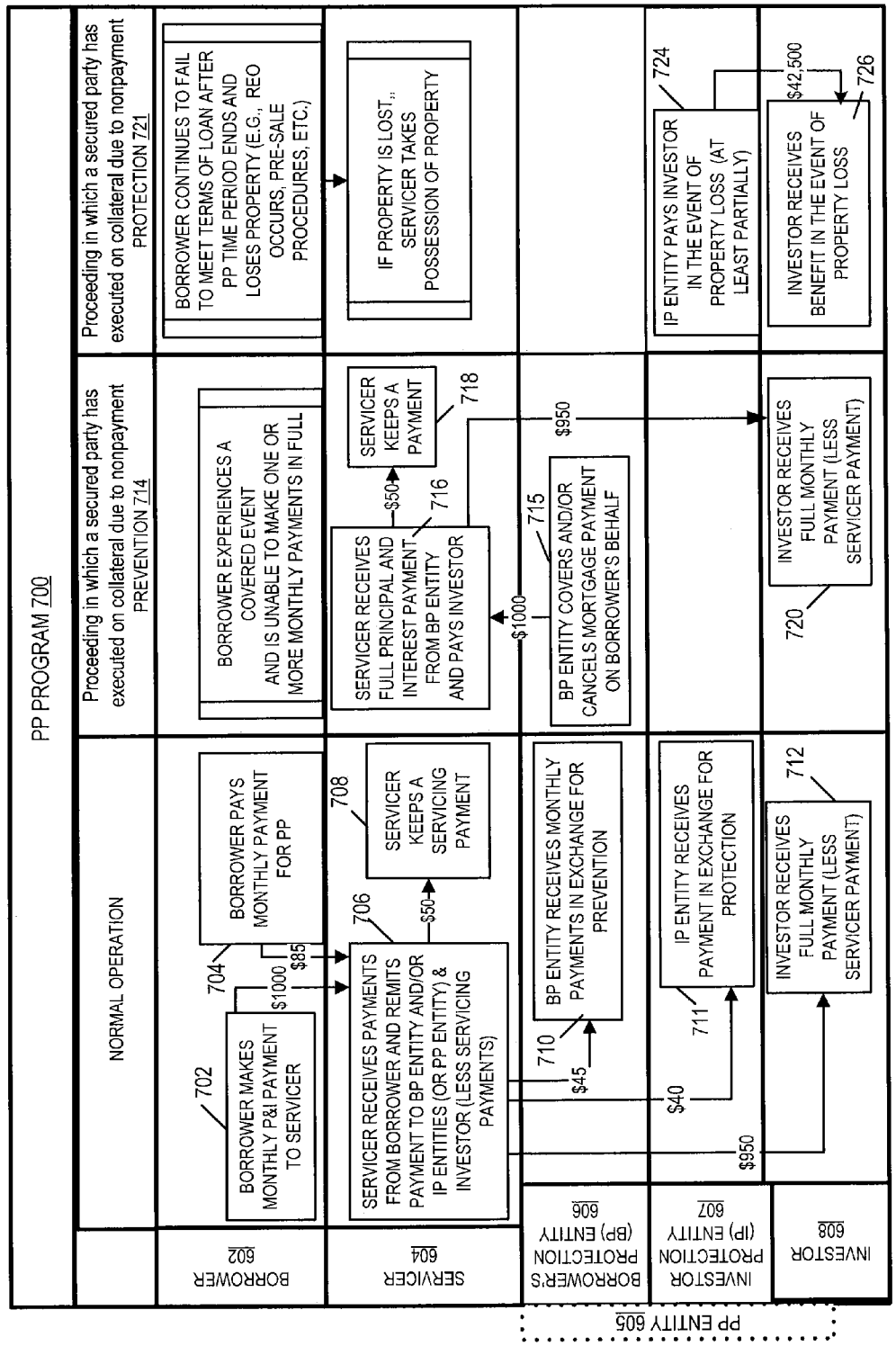

FIG. 7 is an exemplary implementation of the method of FIG. 6.

Figure 8:
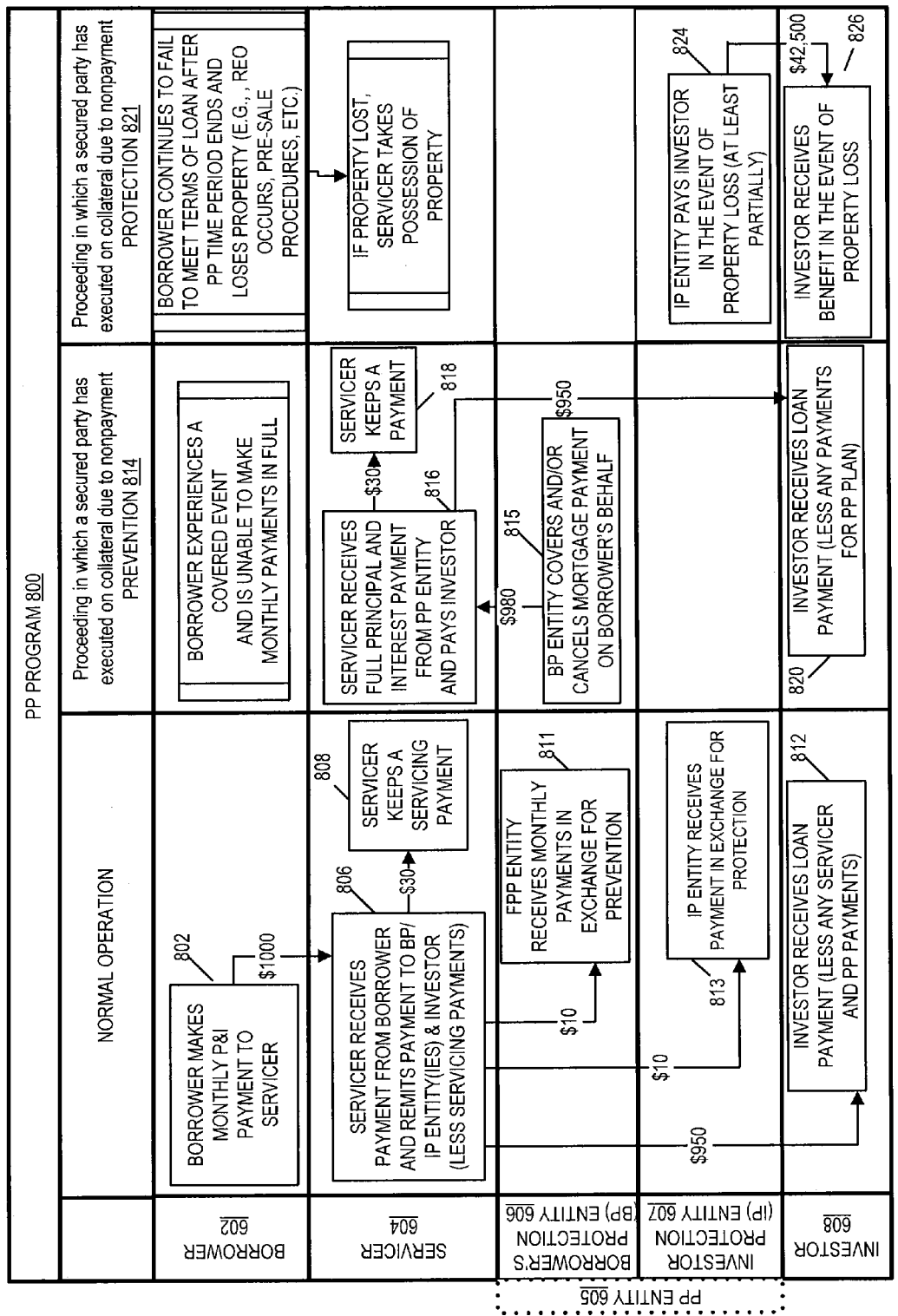

FIG. 8 is an exemplary implementation of the method of FIG. 6.

Figure 9A:
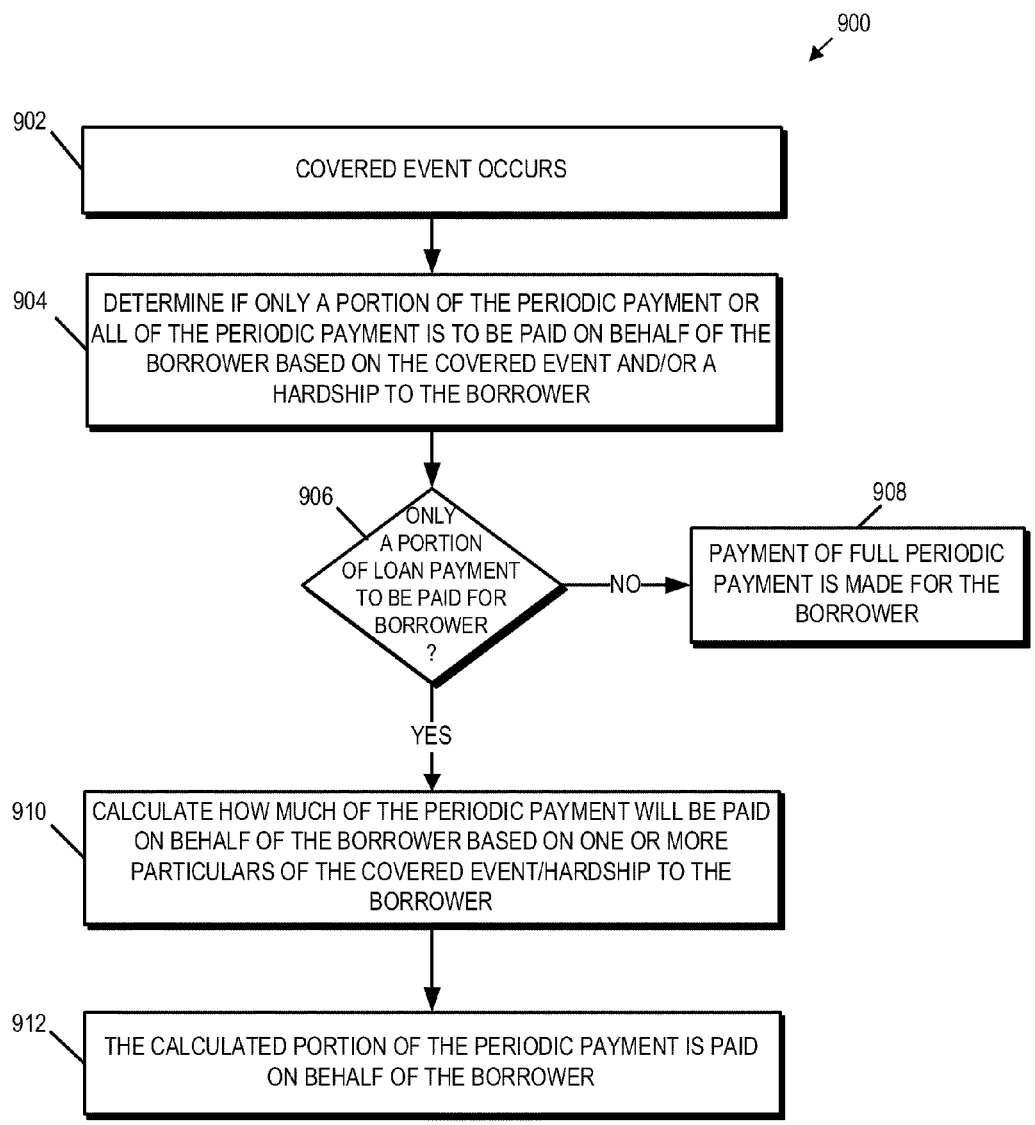

FIG. 9A is a flow chart of a method for determining what portion of the loan payment will be covered in accordance with an embodiment of the proceeding in which a secured party has executed on collateral due to nonpayment prevention and protection plan.

Figure 9B:
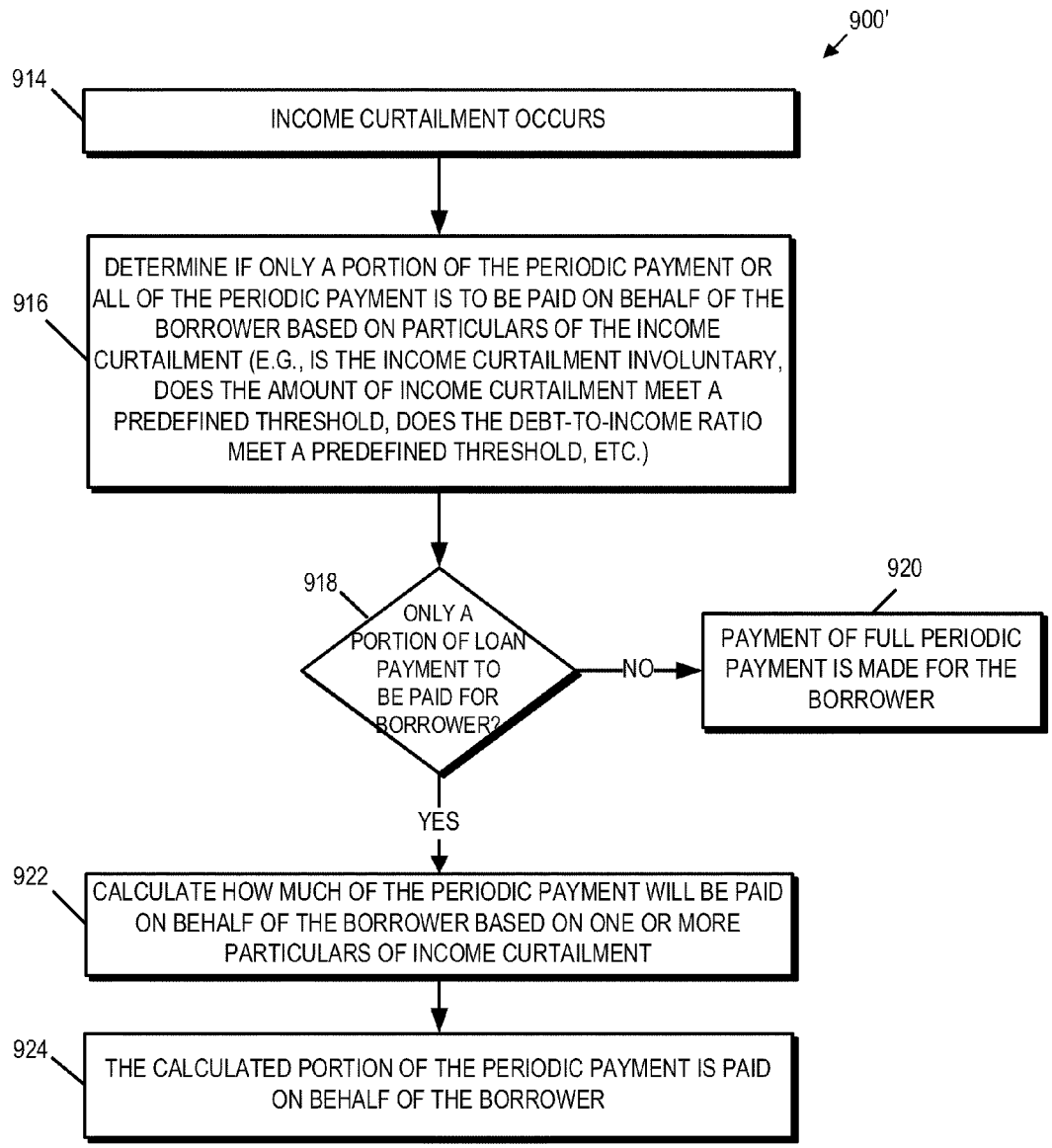

FIG. 9B is an exemplary implementation of the method of FIG. 9A.

Figure 10:
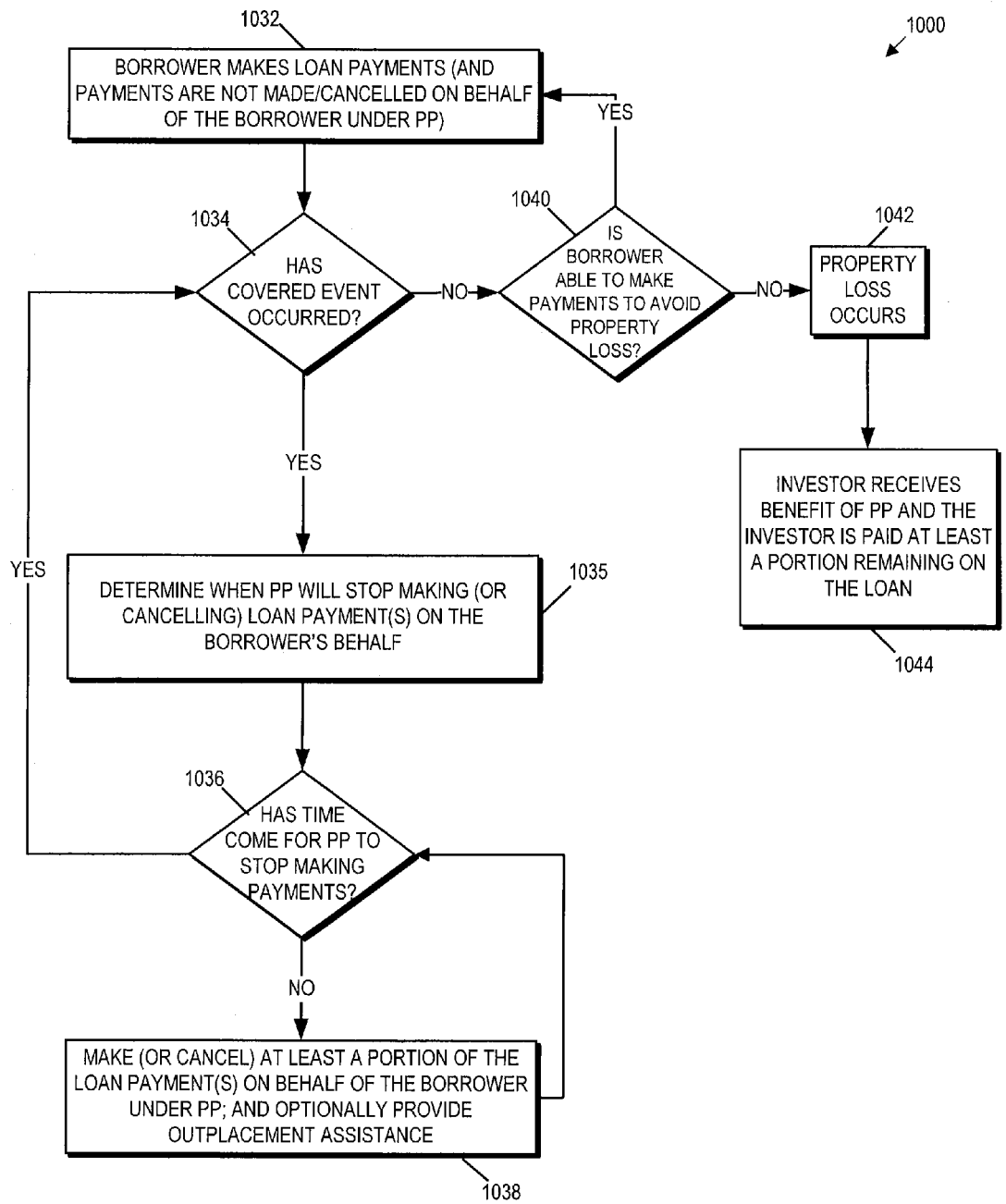

FIG. 10 is a flow chart of a method for determining when loan payment(s) will be covered in accordance with an embodiment of the proceeding in which a secured party has executed on collateral due to nonpayment prevention and protection plan.

Figure 11:
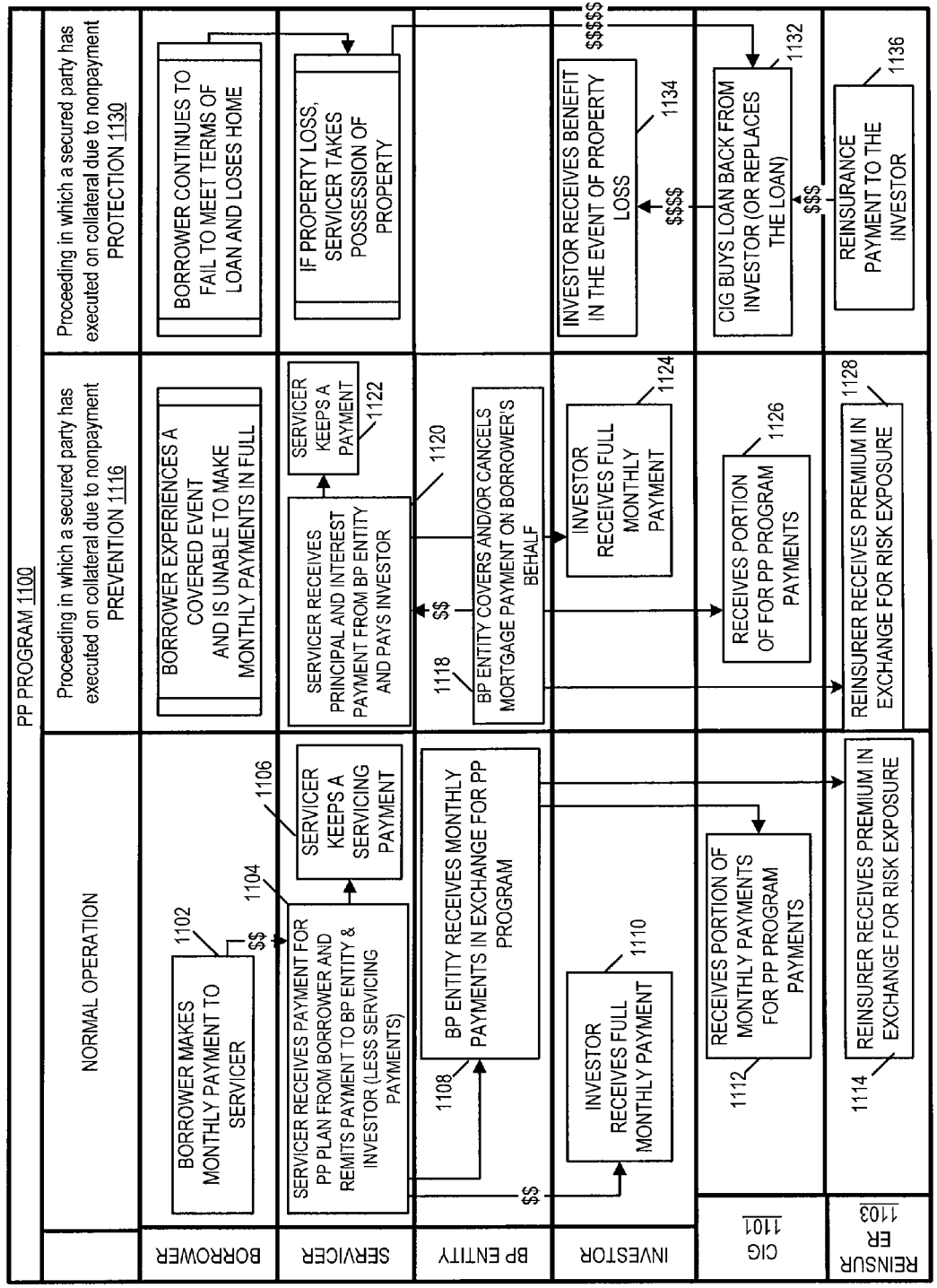

FIG. 11 is a flow chart of a method for a proceeding in which a secured party has executed on collateral due to nonpayment prevention and protection plan in accordance with yet another embodiment of the present invention.

Figure 12:
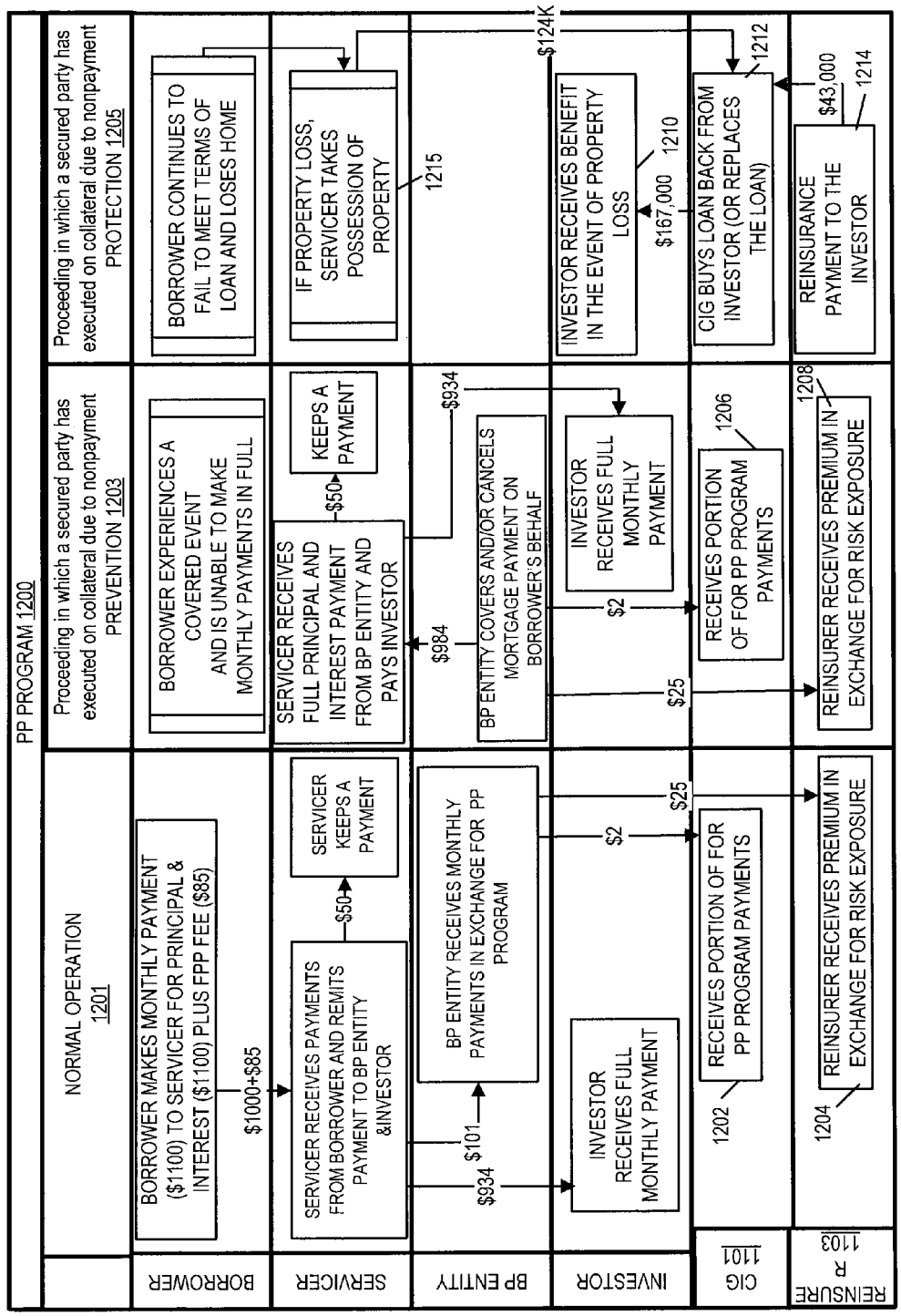

FIG. 12 is an example of the method of FIG. 11.

Figure 13A:
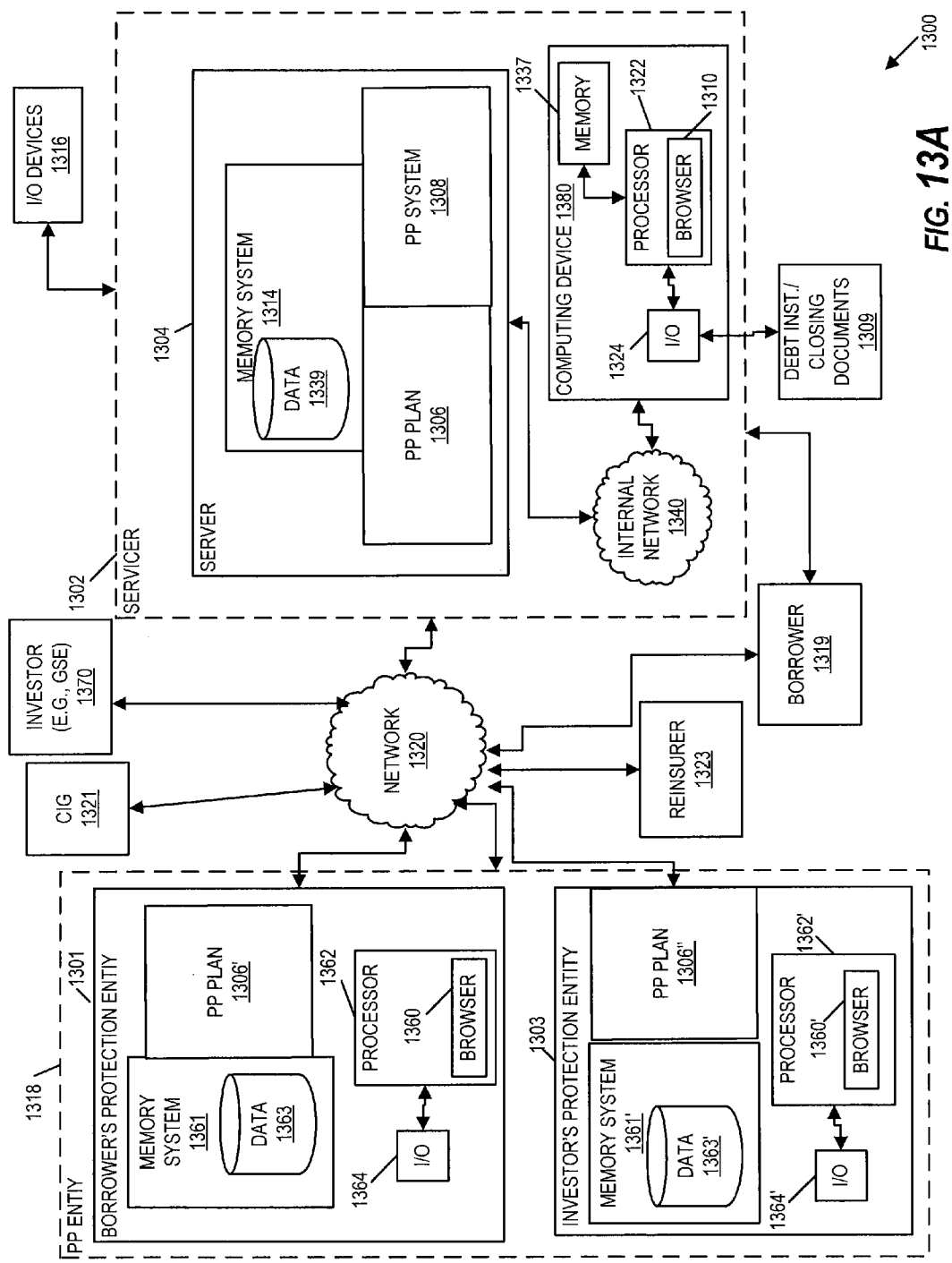

FIG. 13A is a block schematic diagram of an example of a system for a proceeding in which a secured party has executed on collateral due to nonpayment prevention and protection plan in accordance with another embodiment of the present invention.

Figure 13B:
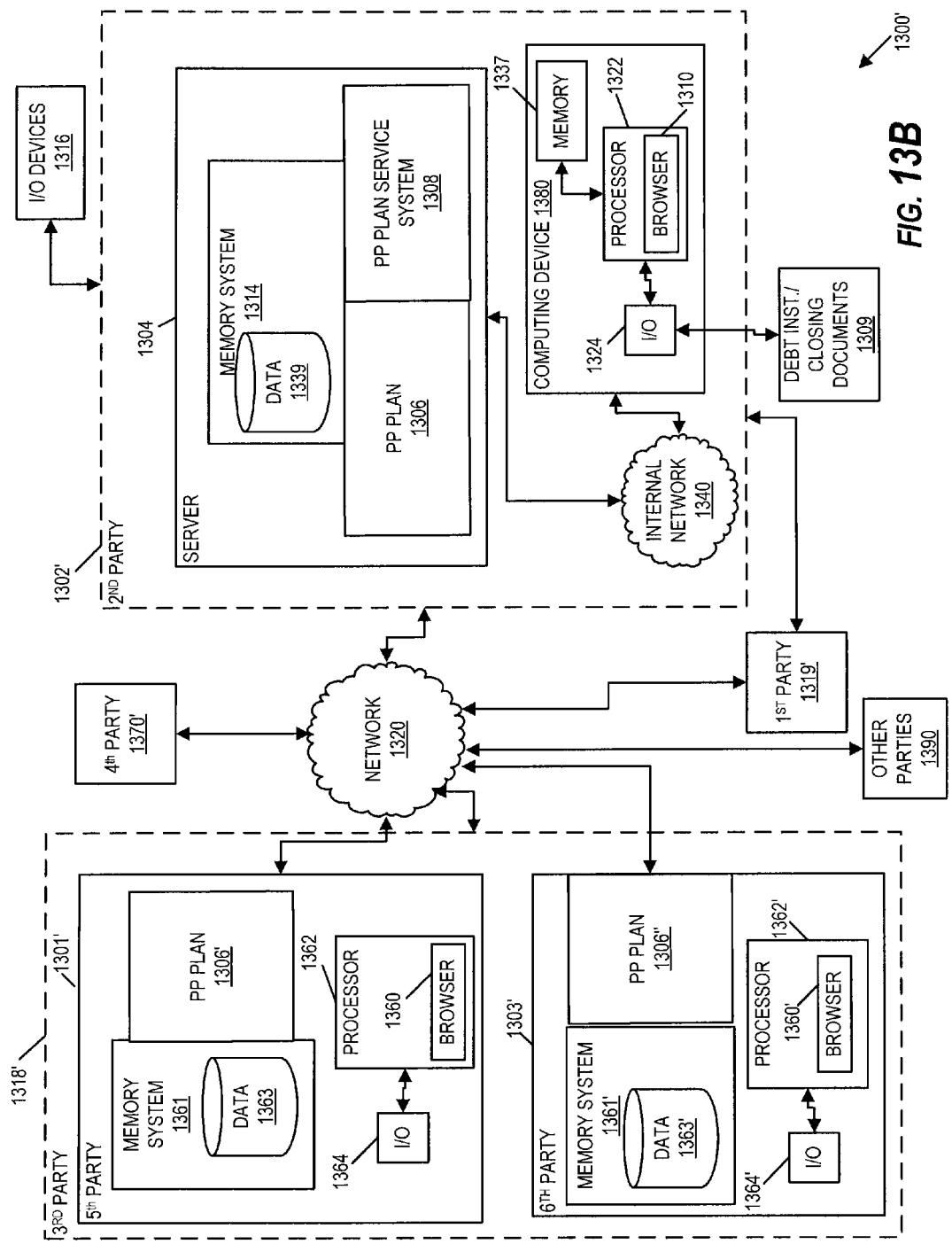

FIG. 13B is a block schematic diagram of another example of a system for a proceeding in which a secured party has executed on collateral due to nonpayment prevention and protection plan in accordance with yet another embodiment of the present invention.

Figure 14:
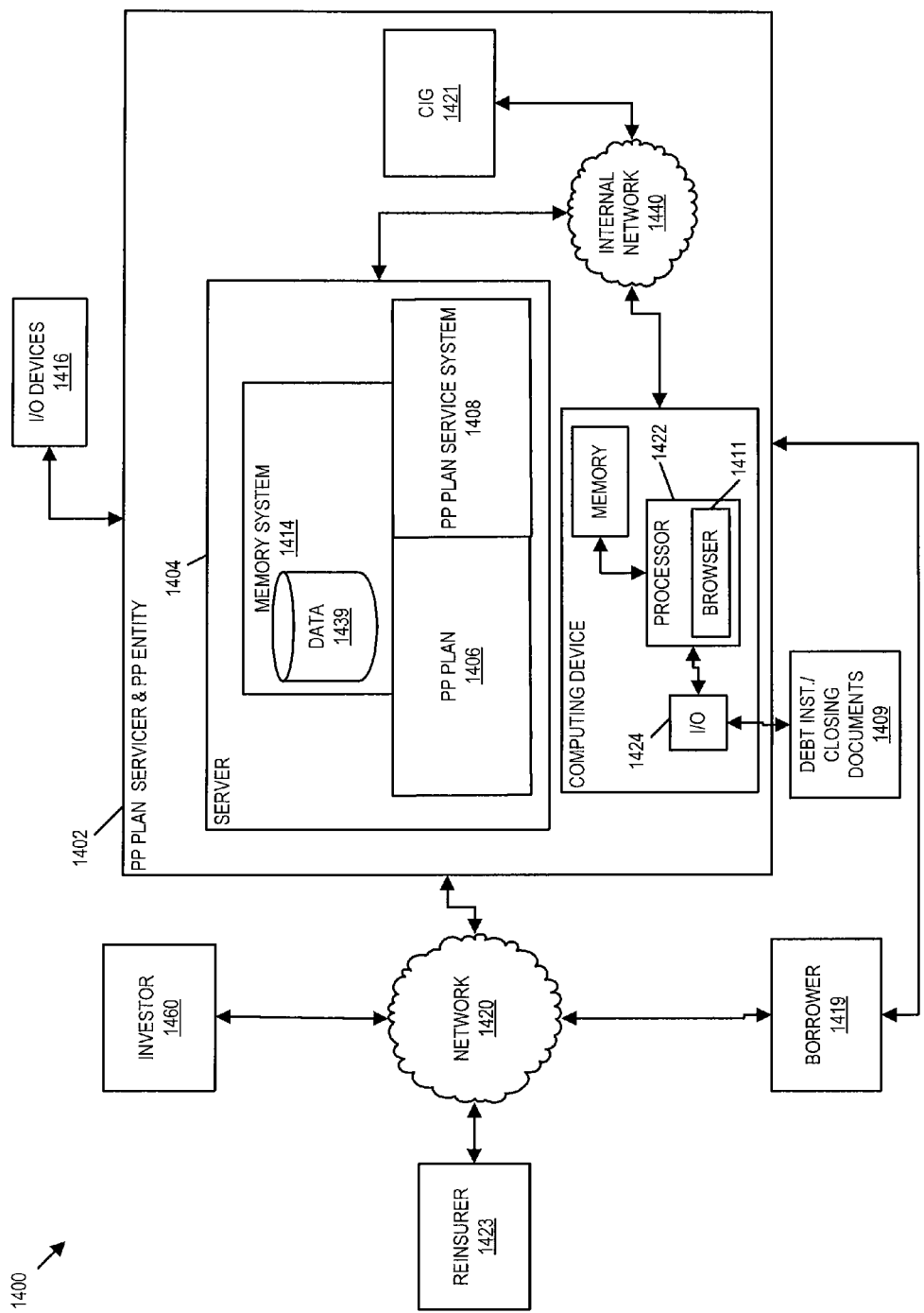

FIG. 14 is a block schematic diagram of an example of a system for a proceeding in which a secured party has executed on collateral due to nonpayment prevention and protection plan in accordance with yet another embodiment of the present invention.

Figure 15:
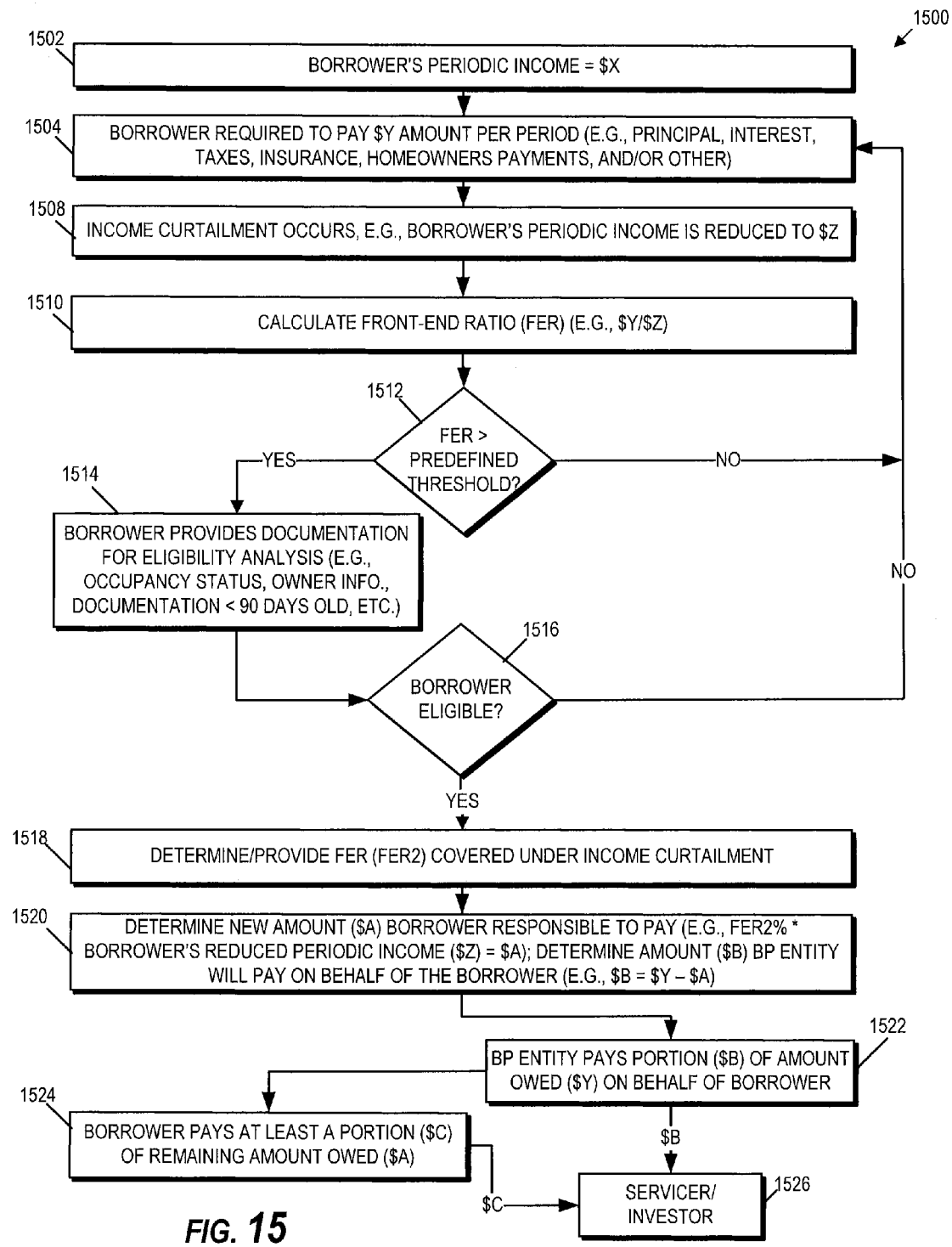

FIG. 15 is a flow chart of a method for income curtailment in accordance with yet another embodiment of the present invention.

FIGS. 16A-C illustrate exemplary implementations of the method of FIG. 15.

FIG. 16D is a flow chart of a method for income curtailment in accordance with yet another embodiment of the present invention.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Like numbers refer to like elements throughout.

It should be understood that terms like "lending institution," "borrower," "servicer," "investor," "financial institution," and even just "institution" or "entity" are used herein in their broadest sense. Institutions, organizations, or even individuals that process loans are widely varied in their organization and structure. Terms like servicer, lending institution, financial institution and even "borrower protection entity," "investor protection entity," and "PP entity" are intended to encompass all such possibilities, including but not limited to, banks, finance companies, brokerages, credit unions, mortgage companies, insurance companies, entities who grant loans to secure the purchase of property, any combinations thereof, a third party entity separate from any of the above, and/or the like. Additionally, disclosed embodiments may suggest or illustrate the use of agencies or contractors external to the institution to perform some of the method steps disclosed herein. These illustrations are examples only, and an institution or business can implement the entire invention on their own computer systems or even a single work station if appropriate databases are present and can be accessed. Further, the term "cover" (or variants thereof) relates to paying, waiving, cancelling, and/or postponing.

FIG. 1 is a high-level method 100 of a proceeding in which a secured party has executed on collateral due to nonpayment prevention and protection (PP) plan in accordance with an embodiment of the present invention. As illustrated in block 102, a borrower is enrolled in the proceeding in which a secured party has executed on collateral due to nonpayment prevention and protection plan, where the proceeding in which a secured party has executed on collateral due to nonpayment prevention and protection plan is associated with a loan that is secured by property, according to some embodiments of the present invention. As represented by decision block 104, a determination is made as to whether a covered event occurs. As represented by block 106, if a covered event occurs, at least a portion of the periodic payment on the borrower's loan is covered (i.e., paid, postponed, waived, or canceled) by another entity on the borrower's behalf as long as the PP plan is active for the borrower, thereby effectively preventing proceedings in which a secured party has executed on collateral due to nonpayment or other property loss for the borrower for a period of time (even though the borrower is not paying the complete periodic payment during such time). Additionally, for those who became involuntarily unemployed, non-monetary assistance may be provided to the borrower, including outplacement assistance (e.g., providing office space, maintaining a job bank, allowing access to a career search tool, providing career consulting and resume writing assistance, providing a dedicated career coach, etc.).

In decision block 108, after the proceeding in which a secured party has executed on collateral due to nonpayment prevention coverage ends or stops covering payments for the borrower, a determination is made as to whether property loss, such as proceedings in which a secured party has executed on collateral due to nonpayment, occurs for the borrower's property. For example, in some embodiments of the invention, the PP plan is configured to cover a borrower's payments only for a predetermined period of time, but may not be enough for some borrowers to avoid proceedings in which a secured party has executed on collateral due to nonpayment if the borrower still cannot make his payments after the expiration of PP coverage. As represented by block 110, if proceedings in which a secured party has executed on collateral due to nonpayment occurs or other property loss does eventually occur (despite the assistance previously provided to the borrower by the PP plan), then the proceeding in which a secured party has executed on collateral due to nonpayment protection portion of the PP plan allows for payment/cancellation to the investor or other party in the amount of at least a portion of the outstanding debt on the loan (or another amount). While FIG. 1 discloses a high-level implementation of the PP plan, a more detailed discussion of various embodiments of the PP plan are presented below with reference to FIGS. 2-16.

FIG. 2 is a block diagram of a PP plan 200 in accordance with an embodiment of the present invention. As shown by reference numeral 201, the PP plan 200 spans from a covered event occurring 202 (or other trigger) until the loss of property 203 (or other similar event). The proceeding in which a secured party has executed on collateral due to nonpayment prevention portion 204 of the PP plan 200 spans from a covered event occurring 202 (or other trigger) until proceedings in which a secured party has executed on collateral due to nonpayment occurs 205 (or other property loss) or the expiration of proceeding in which a secured party has executed on collateral due to nonpayment prevention 204 coverage (e.g., maximum amount paid, expiration of predetermined time period, covered event ceases to affect the borrower, etc.) (not shown). The investor protection portion 206 (also referred to herein as the proceeding in which a secured party has executed on collateral due to nonpayment protection portion) of the PP plan 200 is activated during proceedings in which a secured party has executed on collateral due to nonpayment 205 and/or property loss 203.

Although one embodiment of the PP plan 200 includes both the proceeding in which a secured party has executed on collateral due to nonpayment prevention portion 204 and investor protection portion 206 (or proceeding in which a secured party has executed on collateral due to nonpayment protection portion), according to some embodiments described herein, it should be understood that other embodiments of the PP plan 200 may include only the proceeding in which a secured party has executed on collateral due to nonpayment prevention portion 204 or only the investor protection portion 206 (or proceeding in which a secured party has executed on collateral due to nonpayment protection portion).

According to some embodiments of the invention, a covered event 202 includes any event, effect, or trigger which can affect the borrower's ability to make one or more periodic payments on the loan. Examples of possible covered events may include income curtailment, disability of the borrower, involuntary loss of employment, hospitalization, accidental death, or the like. It should be understood that these covered events are not an exhaustive list and any other covered events are also possible, such as for example, sudden and substantial stock market losses, any medical condition of the borrower that adversely affects the borrower's ability to work, criminal acts against the borrower, any event which reduces the borrower's income or reduces the amount of disposable income of the borrower, etc.

As shown in FIG. 2, there are three covered events 207 in the exemplary PP plan 200, including involuntary income curtailment, involuntary loss of employment, and hospitalization. It should be understood that covered events should not be limited to events, effects, or triggers which can affect the borrower's ability to make one or more periodic payments on the loan, but instead may be any event as defined by the terms of the PP plan. Additional examples of covered events could be events that adversely affect the value of the borrower's property and/or add additional unexpected expenses for the borrower, such as natural disasters, termites, sinkholes, fire, market forces, etc.

As is described later, assistance for proceeding in which a secured party has executed on collateral due to nonpayment prevention during the proceeding in which a secured party has executed on collateral due to nonpayment prevention portion 204 may include monetary assistance, such as helping the borrower pay periodic loan payments, and/or non-monetary assistance, such as outplacement assistance for the borrower. In one embodiment, outplacement assistance includes any activities to help a borrower find a job or a new career, such as providing office space for the borrower during unemployment, maintaining a job bank for the borrower to search for job openings, allowing a borrower to access a career searching tool, providing career consulting and resume writing assistance, providing a dedicated career coach, providing information about unemployment/disability/other benefits, providing specialized skills/career training, or any other activity. Such outplacement assistance can be anything that assists the borrower to be placed back in a position to make the required periodic payments on his/her loan. For example, by assisting the borrower to find a new job/career (if the borrower has been laid off), the borrower will be able to find a new job/career quicker and thus, be able to make regular loan payments again.

Regarding the investor protection portion 206, the investor is protected in the event of a proceeding in which a secured party has executed on collateral due to nonpayment or loss of property that secures the loan. Although the PP plan 200, as disclosed herein, works towards preventing and protecting against proceedings in which a secured party has executed on collateral due to nonpayment, it should be understood that procedures other than proceedings in which a secured party has executed on collateral due to nonpayment are possible where property loss for the borrower occurs. For example, the PP plan 200 also works towards preventing and protecting against the bank buying or obtaining the borrower's secured property (e.g., via real estate owned (REO) proceedings), pre-sale proceedings, preventing failure to meet the terms on a loan (whether the loan is a secured loan or not a secured loan), or the like.

FIG. 3 is a flow chart of a method 300 for a front-end portion of a PP plan in accordance with an embodiment of the present invention. In block 302, a sales system engages a potential borrower to present the various products of the financial institution to enroll a potential borrower in the PP plan. In presenting these products, a borrower meets with a representative of a lending institution, such as a bank, credit union or other financial institution. Alternatively, the borrower is presented with the products via an online banking system. Regardless, the potential sale may be an inbound sale or an outbound sale in order to make initial contact with the borrower.

After the sales system engages the potential borrower, the eligibility of the borrower obtaining a secured loan and/or proceeding in which a secured party has executed on collateral due to nonpayment prevention and protection is determined, as shown in block 304. The lender inputs or enters selected information related to the borrower into a web form or the like presented on a web page or other software program. The web form may be created using Java, HTML or other web-based language. The selected information related to the borrower may include basic demographic information, such as age, sex, resident address, credit history and the like. The selected loan information includes amount being borrowed, security or collateral, term of the loan, interest rate and similar information.

Continuing with block 304, after determining borrower eligibility, a determination is made as to which products the borrower qualifies to accept. The financial institution representative selects an appropriate loan product (e.g., mortgage) and/or the proceeding in which a secured party has executed on collateral due to nonpayment prevention and protection plan based upon the borrower's circumstances and the purpose for the products. One or more loan products that the borrower qualifies for may be offered to the borrower.

If decision block 306 determines that the borrower is not eligible, the method 300 continues to block 308 where the method 300 ends. Otherwise, the method 300 continues to block 310.

The financial institution representative sells one or more of the qualified loan products to the borrower by first offering a loan product to the borrower, as shown in block 310. In addition to or in lieu of offering the loan product to the borrower, the financial institution representative provides information and advises the borrower about the proceeding in which a secured party has executed on collateral due to nonpayment prevention and protection plan. For example, the financial representative can offer the proceeding in which a secured party has executed on collateral due to nonpayment plan along with a loan that is being offered to the borrower as an addendum to the just-offered loan. By way of another example, if the borrower is already obligated under an existing loan, the financial institution representative may offer the PP plan to the borrower as an addendum to such existing loan to help prevent failure to meet the terms on the existing loan and/or to prevent any property that is secured to the existing loan. The financial institution representative also accesses a web site of a PP servicer for information about the product and for a quote for the product based on information related to the borrower and the loan. In block 312, the information provided to the borrower includes a short form disclosure and/or long form disclosure related to the loan and/or PP plan as may be required by law. Other information and disclosures may also be presented to the borrower.

In one embodiment, the PP may be non-optional for the borrower that is trying to obtain a loan, such that the PP must be included as required part of a loan. Additionally, the PP may be non-optional for borrowers who already have existing loans, but who meet certain predefined criteria.

It is noted that the PP plan may be offered to the borrower for free or a reduced payment for a predetermined amount of time. In one embodiment, the PP plan is offered for free for twelve months, for example, where no payments are incurred or collected during this time for the PP plan to remain active. After the predetermined amount of time, periodic payments may be collected for the PP plan to remain active so that, in the event that a covered event occurs, PP will cover the loan payments for the borrower. The periodic payments may be a premium paid for the PP plan. It is noted that the periodic payments collected may be in addition to any principal and interest (P&I) payments made on the loan or may be taken directly out of each P&I payment made by the borrower, such as by taking a portion of the interest payment and applying that interest portion as the payments for the PP plan to remain active.

Nonetheless, in decision block 314, a determination is made as to whether the borrower accepts PP. The borrower can accept PP by signing the required documents, such as an PP agreement, loan PP addendum, and/or the like. Depending on the location in the loan cycle, an electronic signature, e-signature (e.g. a bio-signature), online signature, wet signature, or any other way to indicate acceptance of the PP plan may be required.

If the borrower does not accept PP, the method 300 may end at block 308 or continue to normal loan fulfillment processes (not shown). A waiver may be printed by the lender from the web site if the borrower is not going to accept the PP plan.

If the borrower has accepted PP, the method 300 continues to block 316. In block 316, in response to the borrower accepting PP, an addendum and welcome letter is printed by the lender from the web site of the servicer to be included in the loan documentation for the borrower to include the PP plan as a part of, an addendum to, or to be associated with a mortgage or other loan, whether it be an existing loan/mortgage or a loan/mortgage being accepted concurrently.

As illustrated in block 318, after setting up the mortgage or other loan product for the borrower, loan fulfillment is completed for the mortgage/loan product and/or the PP accepted by the borrower. In one embodiment, the mortgage/loan product is fulfilled during the loan fulfillment process and the PP is fulfilled and/or accepted thereafter. In another embodiment, the loan product and PP plan are fulfilled at the same time. It yet another embodiment, only PP can be fulfilled for an existing loan. It should be understood that the loan product and the PP plan may be offered by the same financial institution or separate institutions. In one embodiment, the PP plan is offered as an addendum to the loan product, as previously mentioned.

Continuing with block 318, after product fulfillment, the borrower is enrolled in the PP plan. Enrollment in PP activates the PP plan so that that proceeding in which a secured party has executed on collateral due to nonpayment or other property loss may be prevented in the event that a covered event occurs, as will be described in more depth below with regard to FIGS. 4-14.

In block 320, the mortgage/loan and PP information (e.g., terms, conditions, obligations, and/or the like) is then loaded or logged into a servicing system of the servicer or other entity. The servicing system is maintained by the servicer, by another entity under contract with the servicer or by some other entity. Servicing may include collecting payments for the PP plan and mortgage payments, monitoring for covered events, paying benefits or claims in the event that one of the covered events associated with the PP occurs, or other associated services. The servicing may also include accounting, auditing and other administrative and borrower services.

In block 320, the mortgage or other loan product and/or PP is billed to the borrower via a servicing system of the servicer. The servicing system collects the monthly mortgage payments, including any principal and interest owed on the mortgage, as well as any required payments for the proceeding in which a secured party has executed on collateral due to nonpayment prevention and protection plan or other payments. Alternatively, the servicing system collects the monthly mortgage payments, including any principal and interest owed on the mortgage and the payment for the PP plan can be taken from the principal and interest payments. In one embodiment, the servicer acts as a financial intermediary between an investor on the loan and/or a PP entity and the borrower since the servicer collects payment(s) from the borrower (when a covered event has not occurred) and distributes portions of these payment(s) to the PP entity and the investor 208 (and/or other entities). Subject to the terms of the agreement of the proceeding in which a secured party has executed on collateral due to nonpayment prevention and protection plan, the borrower may be able to opt-out of the PP without any payment or with a nominal opt-out payment.

FIG. 4A is a flow chart of a method 400 for a PP plan in accordance with another embodiment of the present invention. The flow chart illustrates actions or events that involve a $1^{st}$ party 402, a $2^{nd}$ party 404, a $3^{rd}$ party 406, and/or $4^{th}$ party 408. The $1^{st}$ party 402 may be an entity, such as an individual, which is responsible for payments on a loan. It should be noted that the $2^{nd}$ party 404 services the mortgage or other loan product as described herein. The $2^{nd}$ party 404 may be, for example, a mortgage servicer. The $3^{rd}$ party 406 provides and services the PP plan, as described herein. The $3^{rd}$ party 406 may be, for example, a proceeding in which a secured party has executed on collateral due to nonpayment prevention and protection PP party, and optionally, the $2^{nd}$ and $3^{rd}$ parties 404, 406 may be a single entity, as is discussed below. The $4^{th}$ party 408 refers to an entity that owns or otherwise invests in the mortgage or other loan product so that periodic principal and interest payments are due to be paid to the $4^{th}$ party 408. For example, in one embodiment, the $4^{th}$ party 408 is an investor on the $1^{st}$ party's loan. In another embodiment, the $4^{th}$ party 408 is a government-sponsored entity (GSE) that owns the $1^{st}$ party's loan. In yet another embodiment, the $4^{th}$ party 408 is a financial institution, such as a bank. It should be understood that any of above-mentioned entities may perform one or more or all of the actions or events in the methods disclosed herein. Furthermore, it will be appreciated by one of ordinary skill in the art that, in some embodiments of the invention, two or more of the parties may be the same or commonly-owned entity. For example, in one embodiment of the invention, the same financial institution may perform the functions of the $2^{nd}$ and $3^{rd}$ parties, or even of the $2^{nd}$, $3^{rd}$, and $4^{th}$ parties.

In block 410, the $1^{st}$ party 402 makes periodic payments to the $2^{nd}$ party 404. As previously mentioned, according to one embodiment, the periodic payments may include both the principal and interest on the loan/mortgage, any payments, such as a monthly payment for the PP plan and servicing payments for the $2^{nd}$ party 404, and any other payments. According to other embodiments, the periodic payments from the $1^{st}$ party 402 may only be the principal and interest as is discussed later with regard to FIG. 6. In such event, some or all of the required payments, such as a periodic payment for the PP plan and servicing payments for the $2^{nd}$ party 404, will be taken out of each of the $1^{st}$ party's principal and interest payments to keep PP active.

In block 412, the $2^{nd}$ party 404 receives the payment from the $1^{st}$ party 402 and remits payment to the $3^{rd}$ party 406 and $4^{th}$ party 408, as illustrated in FIG. 4A. The $2^{nd}$ party 404 keeps a servicing payment for acting as a financial intermediary and/or for performing other services, as shown in block 414.

In block 416, the $3^{rd}$ party 406 receives periodic payments from the $2^{nd}$ party 404 in exchange for proceeding in which a secured party has executed on collateral due to nonpayment prevention and protection. Although it is described herein that the $2^{nd}$ party 404 directly provides the periodic payment for proceeding in which a secured party has executed on collateral due to nonpayment prevention and protection to the $3^{rd}$ party 406, the periodic PP payments may be received directly from the $1^{st}$ party 402 instead.

In block 418, the $4^{th}$ party 408 receives the payment on the mortgage or loan, including the principal and interest payments. In one embodiment, the $4^{th}$ party 408 receives only the minimum amount needed to avoid proceedings in which a secured party has executed on collateral due to nonpayment. In the event that the $4^{th}$ party 408 is a GSE, the payment received from the $2^{nd}$ party 404 may include not only the principal and interest but also a payment for using the GSE, known as a "g- payment."

Block 420 illustrates that the $1^{st}$ party 402 has experienced a covered event and is unable to make periodic payments in full because of the covered event. As previously discussed, a covered event is an event which hinders the $1^{st}$ party's capability of paying one or more periodic loan payments in full, according to one embodiment. Such covered events may be as disability, involuntary unemployment, hospitalization, or the like of the $1^{st}$ party, as previously described. The blocks shown in the proceeding in which a secured party has executed on collateral due to nonpayment prevention portion 422 of FIG. 4A illustrate the process involved when the 1st party 402 experiences a covered event.

In block 424, in response to the 1st party 402 experiencing a covered event, the 3rd party 406 "covers" (i.e., pays, postpones, waives and/or cancels) the periodic mortgage payments required on the 1st party's behalf for at least some predetermined period of time. For example, assuming that PP is active for the 1st party 402, the 3rd party 406 covers either a portion or the full amount of the monthly mortgage payment for the 1st party 402 when the 1st party 402 experiences a covered event so that the 1st party 402 is prevented from proceedings in which a secured party has executed on collateral due to nonpayment occurring during the covered event.

It should be further understood that the 3rd party 406 could just supplement (or reduce/postpone) the payments being made by the 1st party 402 so that the amount being paid by the 1st party 402 does not fall below a specific threshold amount which would trigger a proceeding in which a secured party has executed on collateral due to nonpayment or to an amount which is more manageable for the 1st party 402. In this case, the 1st party 402 will be making partial payments while the 3rd party 406 would be making partial payments in response to the covered event for the predetermined time period.

In block 426, the 2nd party 404 receives the mortgage payments and payments from the 3rd party 406 (and optionally any partial payments from the 1st party 402 or other entity on behalf of the 1st party 402). In block 428, the 2nd party 404 keeps a servicing payment. The 2nd party 404 then remits a periodic mortgage payment and any payment required to the 4th party 408 so that the property is not subject to a proceeding in which a secured party has executed on collateral due to non-payment. It should be understood that the payments for the PP plan and monthly payments remitted (or postponed/cancelled) to the 4th party 408 can be the full monthly mortgage amount or a minimal amount which prevents proceedings in which a secured party has executed on collateral due to nonpayment of the 1st party's property (or any other amount which assists the 1st party 402).

In block 430, the 4th party 408 receives the mortgage payments and any required payments and, therefore, does not initiate proceeding in which a secured party has executed on collateral due to non-payment procedures. Alternatively, or in addition, as previously mentioned, the mortgage payments and/or any required payments can be waived, postponed, and/or cancelled for the 1st party 402 to prevent the 1st party 402 from significantly failing to meet the terms on the loan such that the 4th party 408 does not initiate proceedings in which a secured party has executed on collateral due to non-payment procedures or other procedures for property loss.

In the proceeding in which a secured party has executed on collateral due to non-payment protection section 431 of FIG. 4A, if the attempts to assist the 1st party 402 and a proceeding in which a secured party has executed on collateral due to non-payment, as disclosed above for the proceeding in which a secured party has executed on collateral due to non-payment prevention portion 422, were unable to avoid a proceeding in which a secured party has executed on collateral due to non-payment for the 1st party 402, the PP method 400 continues to block 432 of the proceeding in which a secured party has executed on collateral due to non-payment protection portion 431 where the Pt party 402 loses his property if the 1st party 402 continues failing to meet the terms of the loan. For example, as illustrated in FIG. 4A, during proceedings in which a secured party has executed on collateral due to non-payment prevention 422, the 3rd party 406 covers payments for the 1st party 402 for one year in response to a covered event happening; however, the 1st party 402 is still unable to make the required payments thereafter and the proceeding in which a secured party has executed on collateral due to non-payment prevention 422 has ceased so that the minimum required monthly payments to avoid proceedings in which a secured party has executed on collateral due to non-payment are not being received by the 4th party 408. In such case, the 1st party 402 loses the property that secures the loan/mortgage. Therefore, it follows that the 1st party 402 may be only protected to a certain extent to prevent proceedings in which a secured party has executed on collateral due to non-payment. After a certain amount of efforts are made to prevent proceedings in which a secured party has executed on collateral due to non-payment and the 1st party 402 is still unable to make debt service payments to avoid property loss, proceedings in which a secured party has executed on collateral due to non-payment or other proceedings on the 1st party's property are initiated, resulting in the 1st party losing possession of the property. In this event, the property loss occurs, such as a proceeding in which a secured party has executed on collateral due to non-payment, buying the secured property (REO), pre-sale procedures, or any other procedure where the 1st party 402 loses the property, as shown in block 434.

In block 436, the 3rd party 406 pays (or covers) the 4th party 408 in the event of property loss (e.g., proceedings in which a secured party has executed on collateral due to non-payment, etc.) of the 1st party 402. The amount paid is at least a partial amount of the outstanding balance remaining on the mortgage/loan.

In block 438, the 4th party 408 receives the benefit in the event of proceedings in which a secured party has executed on collateral due to non-payment/property loss of the 1st party 402. For example, the 4th party 408 receives the payment from the 3rd party 406 of at least a portion (or the total amount) of the outstanding balance remaining on the loan, as discussed in block 436 above.

In some embodiments, the 1st party 402 is the borrower, the 2nd party 404 is a servicer, the 3rd party 406 is an "~~PP~~ entity" (or the 3rd party can be two separate entities—"borrower's protection party" and "investor's protection entity," as discussed later in FIG. 4B) and the 4th party 408 is the investor on the loan. Although the above-discussed method 400 has been described using 1st party 402, 2nd party 404, 3rd party 406 and 4th party 408, the remaining portion of the description presented below refer to these parties as borrower, servicer, PP entity (or borrower's protection party and investor's protection entity), and investor, respectfully.

Additionally, any of the 2nd party 404, 3rd party 406 and 4th party 408 of FIG. 4A could be combined as a single entity or two entities. For example, a single entity could perform the one or more of the above-described functions of the 2nd party 404, 3rd party 406 and 4th party 408; a single entity could perform one or more of the above-described functions of the 2nd party 404 and 4th party 408; and a single entity could perform one or more of the above-described functions of the 3rd party 406 and 4th party 408.

FIG. 4B is a flow chart of a method 400' for a proceeding in which a secured party has executed on collateral due to non-payment prevention and protection plan in accordance with yet another embodiment of the present invention The method 400' is similar to FIG. 4A the 3rd party 406 is two parties (i.e., 5th party 405 and 6th party 407) instead of a single party. As illustrated in block 412', the 2nd party 404 receives payments and/or payments from the 1st party 402. The 2nd party 404 remits payments to the 4th party 408, as discussed above with respect to FIG. 4A. However, as illustrated in blocks 416' and 416" in FIG. 4B, the 5th party 405 receives a payment in exchange for proceeding in which a secured party has executed on collateral due to non-payment prevention for the 1st party 402 and the 6th party 407 receives a payment in exchange for proceeding in which a secured party has executed on collateral due to non-payment protection for the 4th party 408, respectively.

Accordingly, in the event of a covered event happening under the proceeding in which a secured party has executed on collateral due to non-payment prevention portion 422' of the proceeding in which a secured party has executed on collateral due to non-payment prevention and protection plan 400', the 5th party 405 covers at least a portion or all of the payments for the 1st party 402, as represented by block 424'.

In the event of proceeding in which a secured party has executed on collateral due to non-payment or continued failure to meet the terms of the loan, the method 400' continues to the proceeding in which a secured party has executed on collateral due to non-payment protection portion 431' of the proceeding in which a secured party has executed on collateral due to non-payment prevention and protection plan 400'. As represented by block 436', the 6th party 407 pays the 4th party 408 in the event of proceeding in which a secured party has executed on collateral due to non-payment or other property loss.

As illustrated in FIG. 4B, the 5th party 405 is an entity that separate from the 6th party 407 so that the 5th party 405 is an entity to prevent proceedings in which a secured party has executed on collateral due to nonpayment for the 1st party 402 while the 6th party 407 functions to protect the investor in the event of proceedings in which a secured party has executed on collateral due to nonpayment or further failure to meet the terms of a loan, according to an embodiment.

It should be understood that any of the blocks in FIGS. 1, 3, 4A and 4B could be performed by one or more systems such that the end-to-end system could reside entirely on a single system across several systems. Any or all of these systems could be internal systems of a financial institution and/or external systems another third party. An example of such system is illustrated in FIG. 5.

FIG. 5 is a high-level block schematic diagram of an example of a system 500 for a PP plan in accordance with an embodiment of the present invention. The system 500 includes a communications interface 508, a PP entity (or a borrower's protection entity and/or an investor's protection entity) 510, a processor 514, a memory system 516, data 518 and a PP program 520. As discussed above, the PP entity 510 may be a single entity or instead be two entities: a borrower's protection entity and/or an investor's protection entity.

The communications interface 508 includes a network interface 511 and a user interface 512. The communications interface 508 can be used to interface with a web server, a computer at a bank for enrolling and/or managing the PP plan, or the like. The PP program 520 operates or runs on the processor 514 via the memory system 516 using the communications interface 508. The PP program 520 includes computer-executable instructions accesses PP plan data 518, such as terms and conditions, to allow the system 500 to service the PP plan, as described above. These computer-executable instructions and PP plan data 518 may be embodied in transitory or non-transitory computer-readable mediums, as is discussed in more detail later. The PP system 500 can communicate with the borrower 502 either directly (e.g., via a representative at a financial institution) or through other entities and/or systems 504, such as a servicer and/or PP entity.

FIG. 6 is a flow chart of a method for a PP plan 600 in accordance with an exemplary embodiment of the present invention. The flow chart and the PP method 600 of FIG. 6 and the associated description below is similar to the description of the method 400 of FIGS. 4A-4B; however, the flow chart of PP plan 600 of FIG. 6 illustrates actions or events that involve a borrower 602, a servicer 604, an PP entity 605 (or borrower's protection entity 606 and/or investor's protection entity 607), and an investor 608.

As illustrated, the PP entity 605 can be a single entity that performs the functions of the borrower's protection entity 606 and investor's protection entity 607.

It should be noted that borrower's protection entity 606, investor's protection entity 607 and/or a servicer 604 or similar entity or group of entities provides and services the PP plan, as described herein. The investor 608 refers to an entity that owns or otherwise invests in the mortgage so that periodic principal and/or interest payments are due to be paid to the investor 608. In one embodiment, the investor 608 is a government-sponsored entity (GSE). In another embodiment, the investor 608 is a financial institution or a representative thereof. As previously mentioned, it should be understood that any of above-mentioned entities may perform one or more or all of the actions or events in the methods disclosed herein. In other words, it will be appreciated that the same institution may, in some embodiments, perform the functions of the servicer 604 and the PP entity 605 (or borrower's protection entity 606 and/or investor's protection entity 607), the investor 608 and the PP entity 605 (or borrower's protection entity 606 and/or investor's protection entity 607), the investor 608 and the servicer 604, or the servicer 604, PP entity 605 (or borrower's protection entity 606 and/or investor's protection entity 607), and the investor 608.

In block 610, the borrower makes periodic (e.g., monthly) payments to the servicer. In block 612, the servicer 604 receives the payments for the PP plan and/or payments from the borrower 602 and remits payment to the borrower's protection entity 606, the investor's protection entity 607, the investor 608 or other entity as illustrated in FIG. 6. The servicer 604 may keep a servicing payment for acting as a financial intermediary and/or for performing other services, as shown in block 614. It should be understood that the payments paid to the borrower's protection entity 606 and/or the investor's protection party 607 may be received from entity other than the servicer 604. For example, the investor 608 may make payment payments to the borrower's protection entity 606 and/or the investor's protection entity 607 in addition to or in lieu of the payments made by the servicer 604.

In block 616, the borrower's protection entity 606 receives periodic payments from the servicer 604 in exchange for proceeding in which a secured party has executed on collateral due to nonpayment prevention. In block 617, the investor's protection entity 607 receives periodic payments from the servicer 604 in exchange for proceeding in which a secured party has executed on collateral due to nonpayment protection. Although it is described herein that the servicer 604 directly provides the periodic payments for proceeding in which a secured party has executed on collateral due to non-payment prevention and protection to the borrower's protection entity 606 and the investor's protection entity 607, the payments for proceeding in which a secured party has executed on collateral due to nonpayment prevention and/or proceeding in which a secured party has executed on collateral due to nonpayment protection may be received directly from the borrower 602 or from another entity (e.g., the investor 608) instead.

In block 618, the investor 608 receives the loan payment(s) on the loan/mortgage including the principal and interest payments. In one embodiment, the investor 608 receives only the minimum payment amount needed to avoid proceedings in which a secured party has executed on collateral due to nonpayment.

Block 620 represents that the borrower 602 has experienced a covered event and is unable to make periodic payments because the covered event is likely affecting the borrower's ability to pay on the loan. As previously discussed, a covered event is an event which hinders the borrower's capability of paying the monthly payment, such as disability of the borrower 602, involuntary unemployment, hospitalization of the borrower 602 and the like. The blocks shown in the proceeding in which a secured party has executed on collateral due to nonpayment prevention portion 622 of FIG. 6 illustrate the process involved when the borrower 602 experiences a covered event.

In block 624, in response to the borrower 602 experiencing a covered event, the borrower's protection entity 606 covers (i.e., pays and/or cancels) the periodic loan payments required on the borrower's behalf. For example, the borrower's protection entity 606 can pay either a portion or the full amount of a monthly mortgage payment for the borrower 602 when the borrower 602 experiences a covered event so that the borrower 602 is prevented from proceeding in which a secured party has executed on collateral due to nonpayment during the covered event. This process will continue until the proceeding in which a secured party has executed on collateral due to nonpayment prevention portion 622 of PP 600 ceases to make payments according to the terms of the PP, such as if the PP coverage time period expires, the covered event no longer affects the borrower's ability to make the periodic loan payments in full (or at least a minimum amount) on the loan, the amount of payments covered under PP meets a threshold value, the number of payments made/cancelled by PP has reached the maximum agreed upon amount, or any other trigger that would cause PP to no longer make/cancel payments on behalf of the borrower 602.

The amount of payments and the length of time that the PP entity 606 will be covered (i.e., paid/cancelled) may be varied according to various embodiments of the present invention. For example, the borrower's protection entity 606 may only cover a portion of a periodic loan payment for the borrower 602 in response to an occurrence of a covered event. By way of another example, the borrower's protection entity 606 may cover the full amount of the periodic loan payment on behalf of the borrower 602 in response to the covered event happening to the borrower 602.

Also, the borrower's protection entity 606 may only make payments on behalf of the borrower 602 for a specific predetermined time period. For example, the borrower's protection entity 606 could make payments for one year for the borrower 602 in the event that the borrower 602 loses her job and is unable to make her mortgage payments. However after the one year period, the borrower's protection entity 606 will stop making payments on behalf of the borrower 602. The predetermined time period may be a time length or be time that that continues until a predefined event occurs, such as when the covered event is no longer affecting the borrower's ability to pay the mortgage or loan. For example, the borrower's protection entity 606 may pay the mortgage as long as the borrower 602 is unemployed or is disabled such that proceeding in which a secured party has executed on collateral due to nonpayment is effectively prevented while the covered event is affecting the borrower's ability to make payments on the mortgage or loan. The predetermined time period may be other time durations and can be determined by various factors (e.g., time length determined by the borrower's protection entity 606, by the covered event, by a time schedule, etc.). Conditions as to when PP allows for covering the loan payment(s) on behalf of the borrower 602 are further discussed later.

It should be further understood that the borrower's protection entity 606 could just supplement any payments being made by the borrower 602 so that the total amount being paid to the investor 608 does not fall below a specific threshold amount which would trigger a proceeding in which a secured party has executed on collateral due to nonpayment. In this case, the borrower 602 will be making partial payments while the borrower's protection entity 606 would be making partial payments (or cancelling a portion of the loan payment due) in response to the covered event occurring and while PP is active.

In block 626, the servicer 604 receives the mortgage payments and payments from the borrower's protection entity 606 (and optionally any partial payments from the borrower 602 or other entity on behalf of the borrower 602). In block 628, the servicer 604 keeps a servicing payment. The servicer 604 then remits the periodic loan/mortgage payment and any payment required to the investor 608 so that the property is not subject to a proceeding in which a secured party has executed on collateral due to non-payment. It should be understood that the payment for the PP plan and monthly payments remitted to the investor 608 can be the full monthly mortgage payment, a minimal amount which prevents proceedings in which a secured party has executed on collateral due to nonpayment of the borrower's property, or some amount therebetween.

In block 630, the investor 608 receives the mortgage payments and any required payments and does not initiate procedures which will require property loss of the borrower 602 (e.g., proceedings in which a secured party has executed on collateral due to nonpayment).

In the proceeding in which a secured party has executed on collateral due to nonpayment protection section 631 of FIG. 6, the proceeding in which a secured party has executed on collateral due to nonpayment prevention portion 622 ceases to make or cancel payments on behalf of the borrower 602. If the attempts to assist the borrower 602 and prevent proceedings in which a secured party has executed on collateral due to nonpayment, as disclosed above for the proceeding in which a secured party has executed on collateral due to nonpayment prevention portion 622, were not able to avoid proceedings in which a secured party has executed on collateral due to nonpayment or property loss in the event that the borrower 602 continues to fail to meet the terms on the loan, the method 600 continues to block 632 of the proceeding in which a secured party has executed on collateral due to nonpayment protection portion 631 where the borrower 602 loses his home or property. For example, during proceeding in which a secured party has executed on collateral due to nonpayment prevention 622, the borrower's protection entity 606 could make payments for the borrower 602 for one year in response to the borrower 602 being unable to make monthly payments because of a covered event occurring; however, the borrower 602 is still unable to make the required payments thereafter and the proceeding in which a secured party has executed on collateral due to nonpayment prevention has ceased such that the minimum required periodic loan payments to avoid proceedings in which a secured party has executed on collateral due to nonpayment are not being received by the investor 608. Therefore, the borrower 602 may be only protected to a certain extent to prevent proceedings in which a secured party has executed on collateral due to nonpayment. After a certain amount of efforts are made to prevent proceedings in which a secured party has executed on collateral due to nonpayment and the borrower 602 is still unable to make monthly payments in full, the investor 608 may initiate proceedings which results in property loss for the borrower 602. In this event, the servicer 604 may proceed to take over the property for proceedings in which a secured party has executed on collateral due to nonpayment or the property may be bought via REO proceedings. Alternatively, pre-sale procedures or any other procedure may be initiated where the borrower 602 loses her property, as shown in block 634.

In block 636, the investor's protection entity 607 pays the investor 608 in the event of property loss (e.g., proceedings in which a secured party has executed on collateral due to nonpayment) of the borrower 602. The amount paid is at least a partial amount of the portion remaining on the mortgage. For example, if $100,000 remains on a $500,000 note, the investor's protection entity 607 may pay $100,000 to the investor 608 in the event of an occurrence of a proceeding in which a secured party has executed on collateral due to nonpayment to effectively protect the investor 608 in the event of property loss to mitigate risk. However, in another embodiment, the investor's protection entity 607 may only agree to pay $50,000 of the remaining $100,000 debt on the $500,000 note since the proceeding in which a secured party has executed on collateral due to nonpayment prevention portion of PP mitigates the risk of proceedings in which a secured party has executed on collateral due to nonpayment. In any event, the investor 608 is protected at least partially on the remaining balance of the loan in the event of property loss.

In block 638, the investor 608 receives the benefit in the event of an occurrence of a proceeding in which a secured party has executed on collateral due to nonpayment/failure to meet the terms of a loan of the borrower 602. For example, the investor 608 receives the payment from the investor's protection entity 607, as discussed in block 636 above.

It should be noted that the PP plan, as discussed herein, is directed to being associated with or an addendum to a loan (e.g., a mortgage) that is secured by property (e.g., borrower's real estate, car, boat, etc.). It should be understood that the PP plan may be equally applied to unsecured loans that are not secured by property. For example, if a borrower 602 has a $500,000 loan with an investor 608 that is not secured with any property, the borrower 602 can still use PP such that if the borrower 602 experiences a covered event and is unable to make payments on the loan, the PP plan covers any payment (s) for the borrower 602 while PP is active and the covered event occurs, as previously discussed. This occurs no matter whether the loan is secured with property or not according to some embodiments. In this regard, PP, as disclosed herein, basically attempts to prevent failure to meet the terms on a loan by the borrower 602 and also, optionally protect the investor 608 in the event that the prevention portion of PP does not prevent the borrower 602 from failing to meet the terms_on the loan.

FIG. 7 is an exemplary implementation 700 the method 600 of FIG. 6. In blocks 702 and 704, the borrower 602 pays $1000 P&I payment and $85 PP payments directly to the servicer 604, respectfully. As previously discussed, the borrower 602 may only pay the principal and interest payment (in this example $1000), where any payments that are required are taken out of the principal and/or interest payments on the loan (as is discussed later with respect to FIG. 8).

In block 706, the servicer 604 receives a total amount of $1085. The servicer 604 keeps $50 and then remits $950 to the investor 608 for the monthly mortgage payment, as represented by blocks 708 and 712. Additionally, out of the initial $1085 payment, the servicer 604 (and/or another entity) also pays $45 to the borrower's protection entity (BP entity) 606 to pay for proceeding in which a secured party has executed on collateral due to nonpayment prevention, and $40 to the investor's protection entity (IP entity) 607 to pay for proceeding in which a secured party has executed on collateral due to nonpayment protection, as shown in blocks 710 and 711, respectfully. Since the $45 to the BP entity 606 is for proceeding in which a secured party has executed on collateral due to nonpayment prevention, the borrower 602 receives the benefits and protections of the proceeding in which a secured party has executed on collateral due to nonpayment prevention. Similarly, since the $40 is paid to the IP entity 607, the investor 608 receives the benefits and protections of the proceeding in which a secured party has executed on collateral due to nonpayment protection, as discussed above. It should be understood that both proceeding in which a secured party has executed on collateral due to nonpayment prevention and proceeding in which a secured party has executed on collateral due to nonpayment protection need to be activated at the same time and either proceeding in which a secured party has executed on collateral due to nonpayment prevention or proceeding in which a secured party has executed on collateral due to nonpayment protection may be activated at one time. Also, as previously discussed, an PP entity 605 is an entity that can perform at least some or all of the functions of both the BP entity 606 and IP entity 607, as illustrated in FIG. 7.

Under the proceeding in which a secured party has executed on collateral due to nonpayment prevention section 714 of FIG. 7, the borrower 602 experiences a covered event and is unable (or it is a hardship for the borrower 602) to make at least a portion of the periodic loan payment(s) due. As represented by block 715, the BP entity 606 then covers the $1000 periodic mortgage payment on behalf of the borrower 602 to the servicer 604 in response to the covered event and in response to borrower 602 being enrolled in the proceeding in which a secured party has executed on collateral due to nonpayment prevention portion of proceeding in which a secured party has executed on collateral due to nonpayment prevention and protection plan.

Although FIG. 7 shows that the BP entity 606 covers a complete payment ($1000) to the servicer 604 (and indirectly to the investor 608), the BP entity 606 may make only a portion of the payment (e.g., $500) instead (not shown). This portion (e.g., $500) may be the minimum amount needed that will avoid property loss by the borrower 602 or may be combined with payment from the borrower 602 which will avoid property loss.

In block 716, the servicer 604 receives the $1000 payment from the BP entity 606. The servicer 604 keeps a $50 payment in block 718, and then the servicer 604 remits $950 payment to the investor 608, as illustrated in block 720. Therefore, instead of the borrower 602 having to pay the monthly mortgage payment, the BP entity 606 makes the payment for the borrower 602 for the current month, allowing the borrower 602 to avoid proceedings in which a secured party has executed on collateral due to nonpayment.

As previously discussed in FIG. 6, when the above proceeding in which a secured party has executed on collateral due to nonpayment prevention 714 eventually ceases (e.g., due to expiry of the predetermined time period, the covered event no longer affecting the borrower 602, a maximum payout amount being reached, etc.) and the borrower 602 is still unable to make payments on the mortgage, the investor 608 (or other party) may initiate proceedings in which a secured party has executed on collateral due to nonpayment or other actions which causes the borrower 602 to lose her property, as illustrated in the proceeding in which a secured party has executed on collateral due to nonpayment protection portion 721. In this event, the IP entity 607 then pays the investor 608 at least a portion of the amount that remains a mortgage ($42,500), as shown in block 724, and this money ($42,500) is then received by the investor in block 726.

FIG. 8 is another exemplary implementation 800 of the PP method 600 of FIG. 6, namely that the method 800 of FIG. 8 is the same method 600 illustrated in FIG. 6 except that instead of the borrower 602 submitting a payment for both the P&I and payments for the PP plan, the borrower 602 of FIG. 8 only submits payment for P&I, a shown in block 802. No payment separate from the P&I loan payment is submitted for the PP by the borrower 602. In this regard, to keep PP active, either (1) no payments for PP are required; (2) any required payments for PP are waived; (3) the payments for PP are paid by another party (e.g., investor 608) for the borrower 602; or (4) the payments for PP are deducted from each periodic P&I loan payment, such as by deducting the PP payments from the interest portion of each periodic P&I loan payment. Option (4) is illustrated in FIG. 8 as illustrated in block 806, where the servicer 604 receives the P&I loan payment from the borrower 602 and splits the P&I payment into payments for the PP plan and payments to the BP entity 606, IP entity 607 and investor 608, less a servicing payment. For example, the $1000 P&I loan payment (which is the P&I amount that is due on the loan regardless whether the borrower 602 has PP or not) is transmitted to the servicer 606 from blocks 802 to 806. In block 806, the servicer 604 pays the principal amount plus a portion of the interest (i.e., collectively $950) to the investor 608 as well as keeping a servicing payment (i.e., $30) and remitting payments for the PP plan (i.e., both payments being $10) to the BP entity 606 and IP entity 606, respectively. The latter payments (i.e., the payments of $10) are taken from the interest portion of the P&I loan payment (i.e., $1000). The rest of FIG. 8, including blocks 808-826, substantially correspond with blocks 708-726 of FIG. 7, respectively.

FIG. 9A is a flow chart of a method 900 for determining what portion of the loan payment will be made in accordance with an embodiment of the proceeding in which a secured party has executed on collateral due to nonpayment prevention and protection plan. In block 902, a covered event occurs. The covered event was previously discussed with regard to FIG. 2.

In block 904, in response to the covered event occurring, a determination is made as to how much of the periodic loan payment will be paid/cancelled by the PP entity on behalf of the borrower. Particularly, a determination is made as to whether only a portion or all of the periodic payment is to be paid/cancelled by the PP entity on behalf of the borrower based on the covered event and/or other factors (e.g., some hardship to the borrower).

In decision block 906, if only a portion of one or more periodic loan payments is to be covered for the borrower, the method 900 continues to block 910. However, if the total amount of one or more periodic loan payments is to be covered for the borrower, the method 900 continues to block 910 where payment of the current periodic loan payment is made to the investor (or cancelled) by the BP entity (or by the PP entity) owned behalf of the borrower, as previously discussed.

In block 910, a calculation is made as to how much of the periodic payment will be paid on behalf of the borrower based on one or more particulars of the covered event, such as how much the borrower's income was reduced (income curtailment is discussed in more detail below in FIG. 9B). A method and formula is used to determine such calculation, as is discussed later with regard to FIGS. 15 and 16A-C. The calculated portion of the periodic loan payment is then made on behalf of the borrower by the BP entity (or by the PP entity), in block 912.

FIG. 9B is an exemplary implementation 900' the method 900 of FIG. 9A. The exemplary implementation 900' illustrated in FIG. 9B is directed towards the covered event being income curtailment, as illustrated in block 914. According to an embodiment, income curtailment relates to a reduction in the income of the borrower and/or the borrower's household income.

In response to income curtailment occurring for the borrower, a determination is made as to how much of the periodic loan payment(s) will be paid on behalf of the borrower based on particulars of the income curtailment. These particulars of the income curtailment may relate to the borrower's reduced income, whether the amount of income curtailment meets a predefined threshold, whether the income curtailment is involuntary, how much income the borrower makes relative to the loan value, whether the debt-to-income (DTI) ratio meets a predefined threshold, whether the borrower was working at least a predefined amount (e.g., hours/week, duration of previous employment, etc.) prior to the income curtailment, or other particulars or factors related to income curtailment which may be factored in to deciding how much of each loan payment will be paid on the borrower's behalf.

In decision block 918, if only a portion of the loan payment is to be paid for the borrower the method 900' continues to block 922. However, if decision block 918 determines that the full amount for each periodic payment will be paid for the borrower, the method 900' continues to block 920 where full payment of each periodic payment will be made for the borrower as long as the PP is active during such period.

In block 922, a calculation of how much of each periodic loan payment due will be paid on behalf of the borrower by the BP entity (or by the PP entity) is determined based on the above-mentioned particulars of income curtailment using a formula. In block 924, the calculated portion of the periodic loan payment is then paid by the BP entity (or by the PP entity) on behalf of the borrower when each periodic loan payment comes due while PP remains active for the borrower.

FIG. 10 is a flow chart of a method 1000 for determining when loan payment(s) will be made on the borrower's behalf in accordance with an embodiment of the proceeding in which a secured party has executed on collateral due to nonpayment prevention and protection plan. In block 1032, a borrower makes loan payments on the loan in a normal fashion and payments are not covered by the PP plan at this point. The borrower is making payments for PP so PP remains active in the event that a covered event occurs.

In block 1034, a determination is made as to whether a covered event has occurred. If not, the borrower continues to make payments on the loan, as discussed above in block 1030. If a covered event has occurred, the method 1000 continues to block 1034.

In block 1035, a determination is made as to when PP will stop making (or canceling) periodic loan payment(s) on the borrower's behalf. Determining when this may occur could be based on terms in the PP agreement with the borrower. For example, the PP plan could allow the BP entity (or by the PP entity) to stop make payments after a predetermined time period, based on when the covered event no longer affects the borrower's ability to make periodic payments, based on a received indication that the borrower will start making payments, and the like. If the PP plan is active based on a predetermined time period, PP will stop after a predefined time period (e.g. 12 months, 90 days, etc.) after commencement of the covered event or after commencement of paying the periodic loan payment(s). Alternatively, or in addition, the PP plan may be set up to only pay a certain amount of money, such as $50,000, or a certain number of periodic payments, such as five monthly payments. In one embodiment, the predetermined time period is based on the covered event and different time periods may exist based on the type of covered event. Furthermore, if the PP plan is based on the fact that the covered event no longer affects the borrower's ability to pay on the loan, then the PP may stop making (or cancelling) loan payments on behalf of the borrower upon the occurrence of some other condition. For example, if the covered event is income curtailment and the borrower obtains a new job with higher pay, the PP plan may allow the BP entity (or by the PP entity) to cease covering payments on behalf of the borrower because the borrower is now able to keep making payments, assuming no other covered event has occurred in the meantime.

Nonetheless, in decision block 1036, if it is determined that the time has not come for PP to end, then at least a portion of the periodic loan payment(s) is covered on the borrower's behalf under PP. However, if it is determined that the PP plan ceases and thus, payments will no longer be made/cancelled by the BP entity (or by the PP entity) on behalf of the borrower, the method 1000 continues to block 1034 where it is determined if another covered event occurs. If so, the method 1000 continues to block 1035 and processing occurs as was previously discussed above; otherwise, the method 1000 continues to block 1040, which is discussed below.

In decision block 1040, a determination is made as to whether the borrower (without PP assistance) will make payments on the loan so that the property of the borrower will not be lost through proceedings in which a secured party has executed on collateral due to nonpayment, REO, pre-sales, etc. If the borrower will make the required periodic loan payment(s), the method 1000 returns to block 1032. Otherwise, if the borrower will not make such periodic loan payments that will avoid property loss, the method 1000 proceeds to block 1042 where property is lost via proceedings in which a secured party has executed on collateral due to nonpayment, REO, pre-sales or the like. For example, where the time period for a particular covered event expires and the borrower still can't make payments (and no new covered event occurs), the proceeding in which a secured party has executed on collateral due to nonpayment or other property loss proceedings may be initiated.

In the event of property loss, in block 1044, the investor receives the benefit of the PP plan such that the investor is paid at least a portion (or the total amount) owed that remains or is outstanding on the loan (and/or at least a portion owed remaining on the loan is cancelled or waived).

It should be understood that at least a portion of the payments (if any) for the PP plan to keep PP active could be paid (or waived) by the investor so that the PP plan remains active and the investor is covered in the event of property loss of the borrower.

FIG. 11 is a flow chart of a method for a proceeding in which a secured party has executed on collateral due to nonpayment prevention and protection plan 1100 in accordance with another embodiment of the present invention. The flow chart illustrates actions or events that involve the borrower, the servicer, the PP entity, the investor, a corporate investment group (CIG) 1102, and/or a reinsurer 1104. It should be noted that instead of the borrower, the servicer, the BP entity, CIG, and the investor, the entities may be the $1^{st}$ party, $2^{nd}$ party, $5^{th}$ party, $6^{th}$ party, and $4^{th}$ party, respectively, as discussed above in FIG. 4B, and at least some of the associated functions therebetween may be equivalent.

The portions of the flowchart of FIG. 11 associated with the borrower, servicer, PP entity and investor are similar to those discussed above with regard to FIG. 6, as is discussed below. CIG 1101 relates to an additional intermediary between the investor and the servicer. It should be understood that CIG 1101 may be the same entity as the servicer and/or the BP entity. For example, Bank X may perform the functions of the servicer but may also perform the functions of CIG 1101, so that Bank X is the servicer and the CIG 1101. Additionally, as previously discussed, a single entity may be the servicer, PP entity and/or CIG 1101. For example, Bank Y may perform the functions described herein for the servicer and the PP entity as well as CIG 1101. The reinsurer 1103 functions to provide an additional layer of insurance in the event of proceedings in which a secured party has executed on collateral due to nonpayment, as described later.

In block 1102, the borrower makes monthly payments and payments to the servicer. As previously discussed, the borrower may make only a principal and interest (P&I) payment or may pay a payment in addition to the P&I payment. The servicer receives payments from the borrower and remits payments to the BP entity and investor in block 1104. As previously described, the PP payment may be taken from the interest portion of the P&I payment. Nonetheless, in block 1106, the servicer keeps a servicing payment. As shown in blocks 1108 and 1110, the BP entity receives the periodic payments and payments in exchange for proceeding in which a secured party has executed on collateral due to nonpayment prevention and protection and the BP entity receives the full (or at least a portion) monthly payment owed, respectfully. This process is similar to that described in FIG. 6.

Additionally, the BP entity remits a payment to CIG 1101 at block 1112 for the proceeding in which a secured party has executed on collateral due to nonpayment prevention and protection program payments and also transmits payment to the reinsurer 1103 for a premium in exchange for risk exposure in block 1114.

Turning to the f proceeding in which a secured party has executed on collateral due to nonpayment prevention portion 1116 of FIG. 11, the borrower experiences a covered event and is unable to make monthly payments in full (or at least a minimum amount that will avoid proceeding in which a secured party has executed on collateral due to nonpayment). In this event, in block 1118, the BP entity pays at least a portion of the borrower's mortgage payment on the borrower's behalf to the servicer. If the BP entity and the servicer are a commonly owned entity, the mortgage payment may be canceled or waived for that covered period.

In block 1120, the servicer receives the payments and payments from the BP entity and pays the investor accordingly and in block 1122, the servicer keeps a payment. In block 1124, the investor receives the monthly mortgage payment which will prevent proceeding in which a secured party has executed on collateral due to nonpayment.

In blocks 1126 and 1128, CIG 1101 receives a portion of the proceeding in which a secured party has executed on collateral due to nonpayment prevention and protection plan payments and the reinsurer 1103 receives a premium in exchange for risk exposure, respectfully.

Turning now to the proceeding in which a secured party has executed on collateral due to nonpayment protection portion 1140 of FIG. 11, the borrower continues to fail to meet the terms of the loan and loses her property because the proceeding in which a secured party has executed on collateral due to nonpayment prevention portion 1140 of the proceeding in which a secured party has executed on collateral due to nonpayment prevention protection plan 1100 has expired. In this event, property loss is initiated via proceedings in which a secured party has executed on collateral due to nonpayment, the borrower's house being bought by the bank (REO), pre-sale procedures, etc.

CIG 1101 buys back the loan or mortgage from the investor or replaces the loan or mortgage, as shown in block 1142, by remitting payment to the investor. The investor then receives the payment from CIG 1101, as shown in block 1144.

The proceeds from the sale of the borrower's house are then transferred to CIG 1101 from the servicer, as shown by the transfer from block 1145 to block 1142. Additionally, a reinsurance payout is remitted from the reinsurer 1103 to the investor because of the proceeding in which a secured party has executed on collateral due to nonpayment (or other sale of the property), as shown in block 1146.

FIG. 12 is an exemplary implementation the method of FIG. 11. As shown, a monthly mortgage payment (that includes both principal and interest) is the same as presented in the method 700 of FIG. 7, namely $1000. Additionally, the borrower makes a monthly payment of $85 for proceeding in which a secured party has executed on collateral due to nonpayment prevention and protection, which is also the same as the amount used in exemplary method 700 of FIG. 7. Notably, the borrower is not required to pay a payment other than the principal and interest amount and any required payments can be deducted from the interest portion of the principal and interest payment.

Similar to FIG. 7, the servicer receives the $1085 payment, keeps a $50 servicing payment transmits the monthly payment of $934 to the investor, and transmits a $101 payment for the proceeding in which a secured party has executed on collateral due to nonpayment prevention and protection to the BP entity.

Out of the $101 payment for the PP plan, $2 is sent to CIG 1101 (block 1202) and $25 is sent to the reinsurer 1103 as a premium for risk exposure (block 1204). This process occurs for both the normal operation 1201 of PP (i.e., when the borrower is making payments that will avoid proceeding in which a secured party has executed on collateral due to nonpayment) and during the proceeding in which a secured party has executed on collateral due to nonpayment prevention portion 1203 of PP 1200, as shown in blocks 1206 and 1208, respectively.

During the proceeding in which a secured party has executed on collateral due to nonpayment protection portion 1205 of PP (i.e., when the borrower loses her property by proceeding in which a secured party has executed on collateral due to nonpayment, REO, pre-sales, etc.), CIG 1101 buys back the loan or mortgage from the investor at $167,000, for example, as shown in block 1212. The investor then receives the $167,000 and transfers the loan or mortgage to CIG 1101, as shown in block 1210.

Reinsurance payment is then transferred to CIG 1101 at $43,000 dollars, for example, as illustrated in block 1214. Additionally, the servicer will transfer the proceeds ($124,000) of the proceeding in which a secured party has executed on collateral due to nonpayment or sale of borrower's property to CIG 1101, as shown from the transfer from blocks 1215 to 1212.

The above process for proceeding in which a secured party has executed on collateral due to nonpayment protection 1205, as described above in FIGS. 11 and 12 protects the investor in the event of an occurrence of a proceeding in which a secured party has executed on collateral due to nonpayment. The above process also provides proceeding in which a secured party has executed on collateral due to nonpayment prevention 1203 for the borrower. As previously mentioned, the proceeding in which a secured party has executed on collateral due to nonpayment prevention process 1203 may be separate from the proceeding in which a secured party has executed on collateral due to nonpayment protection portion 1205.

FIG. 13A is a block schematic diagram of an example of a system 1300 and for a proceeding in which a secured party has executed on collateral due to nonpayment prevention and protection plan in accordance with an embodiment of the present invention. The system 1300 includes a proceeding in which a secured party has executed on collateral due to nonpayment prevention and protection servicer 1302. The servicer 1302 includes a server 1304. The server 1304 can be a web server or the like. A proceeding in which a secured party has executed on collateral due to nonpayment prevention and protection plan 1306 and a proceeding in which a secured party has executed on collateral due to nonpayment prevention and protection service system 1308 operate or run on the server 1304. The proceeding in which a secured party has executed on collateral due to nonpayment prevention and protection service system 1308 is operable to service the proceeding in which a secured party has executed on collateral due to nonpayment prevention and protection plan (PP) as described above. Elements or features of the methods of FIGS. 1-4, 6-12 and 15-16, respectively, are embodied in the proceeding in which a secured party has executed on collateral due to nonpayment prevention and protection plan 1306 and service system 1308. The proceeding in which a secured party has executed on collateral due to nonpayment prevention and protection plan 1306 is operable on the server 1304 to provide the proceeding in which a secured party has executed on collateral due to nonpayment prevention and protection plan offerable concurrently with a loan or mortgage or for an existing loan, as previously described herein. The proceeding in which a secured party has executed on collateral due to nonpayment prevention and protection plan 1306 is adapted to create an addendum 1307 for the proceeding in which a secured party has executed on collateral due to nonpayment prevention and protection plan for inclusion in a debt instrument or closing documents 1309 in response to an indication that a borrower wants to enroll and activate the PP for a predetermined time period, similar to that described above with respect to methods 100-400 and 600-1200 of FIGS. 1-4 and 6-12.

The proceeding in which a secured party has executed on collateral due to nonpayment prevention and protection plan 1306 is also adapted or programmed to provide a quote for the PP in response to selected information associated with a borrower and an associated loan. A servicer representative enters the selected borrower and loan information into a web page or web form when the proceeding in which a secured party has executed on collateral due to nonpayment prevention and protection plan 1306 is accessed via a web browser or the like, such as browser 1310. The proceeding in which a secured party has executed on collateral due to nonpayment prevention and protection plan 1306 is also programmed or adapted to present a web page or form for completion of an application for a PP.

The proceeding in which a secured party has executed on collateral due to nonpayment prevention and protection plan 1306 includes computer-executable instructions that are embodied in a non-transitory computer-readable medium, as is discussed later. These computer-executable instructions perform any of the operations discussed herein, such as the operations and method steps discussed above with regard to FIGS. 1-12 and 15-16.

The system 1300 also includes input and output (I/O) devices 1316. The I/O devices 1316 are separate input and output devices or combination I/O devices that are coupled to the server 1304 to provide an interface with the server 1304 for programming purposes and to control operation of the server 1304. Examples of the I/O devices 1316 include a keyboard, pointing devices, display or monitor, disk drives, optical, mechanical, or infrared I/O devices or the like.

An PP entity 1318 (BP entity 1301 and/or IP entity 1303), borrower 1319, CIG 1321, reinsurer 1323 or other entity/user accesses the proceeding in which a secured party has executed on collateral due to nonpayment prevention and protection plan 1306 via a network 1320, medium or the like, using a browser 1310. The network or medium 1320 is any communication network or system including by way of example, dedicated communication lines, telephone networks, and wireless data transmission systems, two-way cable systems, and customized computer networks, interactive kiosk networks or the like. The network or medium 1320 is the Internet or a private network, such as an intranet or the like, according to some embodiments.

It should be understood that the proceeding in which a secured party has executed on collateral due to nonpayment prevention and protection plan servicer 1302 may be part of the institution that is extending the loan or mortgage to the borrower or may be run by a third party. Additionally, as is described in FIG. 7, the servicer and PP entity may be the same entity or owned by the same entity.

The browser 1310 operates on a processor 1322 of computing device 1380. Separate input and output devices 1324 or combination I/O devices 1316 are coupled to the processor 1322 to permit a PP entity representative or other user to operate and interface with the processor 1322. The I/O devices 1324 are similar to the I/O devices 1316. Examples of the I/O devices 1324 include a keyboard, pointing device, display or monitor, disk drives, optical, mechanical, magnetic, or infrared input/output devices or the like. The I/O devices 1324 are used to assess the proceeding in which a secured party has executed on collateral due to nonpayment prevention and protection plan 1306 and/or the proceeding in which a secured party has executed on collateral due to nonpayment prevention and protection service system 1308. The I/O devices 1324 are also used to access, create and manage the debt instrument of closing documents 1309 including documentation for the PP, data associated with the proceeding in which a secured party has executed on collateral due to nonpayment prevention and protection plan 1339 located on a memory system 1337, and the like using the browser 1310.

The computing device is connected to 1340 which is commutative with server 1304. The internal network 1340 can be an intranet or other network to allow the computing device 1382 to communicate with server 1304.

FIG. 13A illustrates the PP entity 1318 includes a borrower's protection entity 1301 and an investor's protection entity 1303. It should be understood that the borrower's protection entity 1301 and an investor's protection entity 1303 may not be part of a common entity (i.e., the PP entity 1318), which is the reason why the PP entity 1318 is shown with dashed lines.

The borrower's protection entity 1301 and an investor's protection entity 1303 includes a proceeding in which a secured party has executed on collateral due to nonpayment prevention and protection plan 1306', 1306", respectfully, which is commiserate with the proceeding in which a secured party has executed on collateral due to nonpayment prevention and protection plan 1306 residing with the servicer 1302. The BP entity 1301 and IP entity 1303 is allowed to offer, access and manage the proceeding in which a secured party has executed on collateral due to nonpayment prevention and protection plan 1306', 1306", respectively, using browser 1360, 1360' located on the processor 1362, 1362' via I/O devices 1364, 1364' similar to how the servicer can offer, assess and manage the proceeding in which a secured party has executed on collateral due to nonpayment protection plan 1306 located on the server 1304, respectively. A memory system 1361, 1361' stores data 1363, 1363' associated with the proceeding in which a secured party has executed on collateral due to nonpayment prevention protection plan 1306', 1306", respectfully. Data 1363 houses various information about users enrolled in the proceeding in which a secured party has executed on collateral due to nonpayment prevention portion of the proceeding in which a secured party has executed on collateral due to nonpayment prevention and protection plan, covered events for each enrolled user, payment and payment information for each enrolled user, proceeding in which a secured party has executed on collateral due to nonpayment prevention active predefined periods for each enrolled user, and any other data which may be necessary and/or relevant. Data 1363' houses various information about users enrolled in the proceeding in which a secured party has executed on collateral due to nonpayment protection portion of the proceeding in which a secured party has executed on collateral due to nonpayment prevention and protection plan, events which trigger payment to the investor, payment and payment information for each enrolled user, and any other data which may be necessary and/or relevant. This data 1363, 1363' may also be stored on data 1339 residing on the memory system 1314 of server 1304 of servicer 1302. Both the servicer 1302 and the PP entity 1318 (BP entity 1301 and/or IP entity 1303) have access to substantially the same information regarding the proceeding in which a secured party has executed on collateral due to nonpayment prevention protection plan 1306, 1306', and 1306".

The proceeding in which a secured party has executed on collateral due to nonpayment prevention and protection plan 1306' may only relate to the proceeding in which a secured party has executed on collateral due to nonpayment prevention portion of the PP plan and the proceeding in which a secured party has executed on collateral due to nonpayment prevention and protection plan 1306" may only relate to the proceeding in which a secured party has executed on collateral due to nonpayment protection portion of the PP plan. As such, the BP entity 1301 may only manage the proceeding in which a secured party has executed on collateral due to nonpayment prevention portion of the PP plan to protect the borrower and the IP entity 1303 may only manage the proceeding in which a secured party has executed on collateral due to nonpayment protection portion of the PP plan to protect the investor.

The investor 1370 may be connected with the network (e.g., the Internet, private network, etc.) so that any payments can be transferred to the investor via an automated clearing house (ACH) process or another method.

FIG. 13B is a block schematic diagram of another example of a system for a proceeding in which a secured party has executed on collateral due to nonpayment prevention and protection plan in accordance with yet another embodiment of the present invention. FIG. 13B is similar to FIG. 13A, except that the borrower 1319, servicer 1302, PP entity 1318, investor 1370, BP entity 1301, and IP entity 1303 are depicted as the $1^{st}$ party 1319', $2^{nd}$ party 1302', $3^{rd}$ party 1318', $4^{th}$ party 1370', $5^{th}$ party 1301', and $6^{th}$ party 1303', respectively. The roles of each of the $1^{st}$ party 1319', $2^{nd}$ party 1302', $3^{rd}$ party 1318', $4^{th}$ party 1370', $5^{th}$ party 1301', and $6^{th}$ party 1303' were described previously with respect to FIGS. 4A-4B. Additionally, it is noted in FIG. 13B that other parties 1390 may be connected with network 1320, such as a reinsurer, CIG, or any other entity. These other entities can interact with any of the above entities using a computer network or not over a computer network (e.g., in person). Also noted in FIG. 13B is that the $3^{rd}$ party 1318' may be a single entity that performs both of the functions of the $5^{th}$ and $6^{th}$ parties 1301', 1303', as previously discussed with regard to FIG. 4B. However, the $5^{th}$ and $6^{th}$ parties 1301', 1303' may also be entities separate from each other and thus not a single entity.

FIG. 14 is a block schematic diagram of an example of another system 1400 for a proceeding in which a secured party has executed on collateral due to nonpayment prevention and protection plan in accordance with another embodiment of the present invention. As previously discussed, the proceeding in which a secured party has executed on collateral due to nonpayment prevention and protection plan includes a servicer 1402 and PP entity 1418 and optionally includes CIG 1421 and, as illustrated in FIG. 14, the servicer 1402, PP entity 1418 and/or CIG 1441 may be separate entities. However, FIG. 14 illustrates the servicer 1402 and PP entity 1418 as a single commonly owned entity 1402. Also is readily noted in FIG. 14, CIG 1421 is part of or a division of either the PP entity or the servicer. It should be noted that CIG 1421 could be a division of either the PP entity 1418 or servicer 1402 of the system 1400 of FIG. 14. In one embodiment, the CIG 1421 is the same as the IP entity 1303.

FIG. 15 is a flow chart of a method 1500 for income curtailment in accordance with an embodiment of the present invention. Embodiments of income curtailment were previously discussed with regard to FIGS. 9A-9B. The following embodiments provide a further description of income curtailment, according to various embodiments. Particularly, the following description relates to a further description of blocks 922 and 924 of FIG. 9B, according to one embodiment. It should be understood that the income curtailment embodiments discussed herein are directed to the PP plan, but should not limited to only the PP plan and thus, could also be applied to other applications, such as CP+, IU only, etc.

Starting with in block 1502 of FIG. 15, at the time of application, a borrower's periodic income ($X) is determined. The periodic income ($X) may be determined on a basis based on monthly, bi-weekly, or other time period. Such time period may be based on when the borrower receives his pay check. In one embodiment, the periodic income is a monthly gross income. According to various embodiments, such monthly gross income is an amount received before any payroll deductions and includes wages, salaries, overtime, commissions, payments, tips, bonuses, allowances, compensation for personal services, Social Security payments, annuities, insurance policies, retirement funds, pensions, disability or death benefits, unemployment benefits, rental income, and/or other income.

Additionally, as represented by block 1504, at the time of application, the amount ($Y) that the borrower is required to pay per period is determined. Such amount ($Y) may include one or more of the following amounts: principal on the loan, interest on the loan, taxes, insurance (homeowners, hazard, flood), homeowners association or condo payments, and/or any other expenses of the borrower. In one embodiment private mortgage insurance or PP payments are excluded.

In block 1508, income curtailment occurs, has been previously discussed. For example, income curtailment could occur by the borrower's periodic income being reduced to a new amount ($Z). In another embodiment, income curtailment could relate to the borrower's income-to-expenses (X/Y) ratio being reduced.

In block 1510, in response to income curtailment, a front-end ratio (FER) is calculated or determined. For example, the FER could be calculated by dividing the amount owed by the borrower ($Y) by the borrower's new reduced income ($Z) (i.e., FER=$Y/$Z).

As shown in decision block 1512, if the FER is greater than a predefined threshold, the method 1500 continues to block 1514, which is discussed below; however, if the FER is not greater than the predefined threshold, the method 1500 continues back to block 1504.

In block 1514, the borrower provides documentation so that the BP entity can determine if the borrower meets all criteria for income curtailment protection under the PP plan. For example, the BP entity could require the borrower to provide initial and ongoing documentation (such documentation could be required to be less than 90 days old or other predefined time period). The documentation required may be relating to proving occupancy status of the borrower's property, documentation evidencing that the property is owner-occupied single family 1-4 unit property, documentation evidencing that the property is the borrower's primary residence, documentation evidencing that the property is not investor-owned, vacant or condemned, tax return documentation or other tax documentation (e.g., Form 4506-T request for transcript of tax return), two most recent pay stubs, third party documents providing reasonably reliable evidence of the borrower's income, monthly proof of income curtailment for ongoing benefits, or other documentation proving other facts.

Nonetheless, decision block 1516 provides a determination as to whether the borrower qualifies or is eligible for income curtailment payments on behalf of the borrower. If the borrower is not eligible or otherwise does not qualify, the method 1500 proceeds back to block 1504.

If, however, the borrower is eligible or qualifies, the method 1500 proceeds to block 1518, where a new FER ("FER2") is determined/provided. This FER2 amount will be used in the later-described formula for determining the amount of payments that will be made on behalf of the borrower. FER2 may be determined from a look-up table (or may be the same FER as calculated at the time of the loan). Alternatively, FER2 may be calculated based on the pervious FER, the borrower's original income ($X), the borrower's reduced income ($Z), the borrower's expenses ($Y), or any other factor.

In block 1520, a new amount ($A) that the borrower is responsible for is determined/calculated as well as an amount ($B) that the BP entity pays of behalf of the borrower. The borrower's new amount ($A) is determined from a formula (or possibly using a lookup table). In one embodiment, the amount ($A) is calculated by multiplying the FER2 ratio/percentage by the borrower's reduced periodic income ($Z) (i.e., $A=FER2%*$Z). The portion ($B) that the BP entity will cover on behalf of the borrower is the amount owed ($Y) minus the new amount ($A) the borrower is responsible (i.e., $B=$Y-$A).

Then, in block 1522, the BP entity covers the portion ($B) determined in block 1520, and as a result in block 1524, the borrower pays at least a portion ($C) of the remaining amount owed (i.e., $A). It is noted that the borrower's payment portion ($C) could be the full reduced amount owed ($A) or a percentage thereof that will allow the borrower to avoid proceeding in which a secured party has executed on collateral due to nonpayment.

Nonetheless, these payments ($B+$C) or ($B+$A) are remitted to the servicer/investor, in block 1526.

FIGS. 16A-C illustrate exemplary implementations of the method 1500 of FIG. 15. The examples of FIGS. 16A-C require an exemplary FER to be increased above 35% predetermined threshold prior to income curtailment payments to trigger.

Referring first to FIG. 16A, the borrower's periodic payments at application are $1,300 and the borrower's periodic income application is $5,000. The $5,000 is the borrower's monthly modified gross income and the $1,300 is a monthly amount due by the borrower. The FER at time of application is calculated by dividing the borrower's periodic payments by the borrower's periodic income (i.e., $1,300/$5,000), which equals 26.0%. Then, the borrower experienced income curtailment because the borrower's income became reduced to $4,000 from $5,000 (because maybe the borrower was demoted). This results in a 20% income reduction and a resulting FER of 32.5% (i.e., $1,300/$4,000). However, as previously described with regard to decision block 1512 of FIG. 15, since the FER (32.5%) is not greater than the predetermined threshold (35%), then the BP entity does not make payments on behalf of the borrower and the method 1500 returns to block 1504. Therefore, FIG. 16A illustrates that the borrower is "Not Eligible" and the borrower is responsible for the full $1,300 period payments.

FIG. 16B illustrates another embodiment of income curtailment. However, the borrower's income is reduced to $2,500 for FIG. 16B, as opposed to $4,000 of FIG. 16A. Thus, the FER is calculated to be 52.0% (i.e., $1,300/$2,500). Since this FER (52%) exceeds the predetermined threshold of 35% FER, the BP entity will pay a portion of the borrower's payment on the borrower's behalf (assuming that PP is active for the borrower and assuming that the borrower has provided the requisite documentation for eligibility, as discussed above with regard to block 1514 of FIG. 15).

Since the borrower does qualify for income curtailment protection under PP in the example of FIG. 16B, an amount of how much the BP entity covers and how much the borrower is required to pay is now determined. First, as previously discussed in block 1518 of FIG. 15, FER2 is now determined. FER2 is provided for the borrower to be 31%. The amount the borrower is responsible for is based on the new FER2. Accordingly, the borrower is now responsible for 31% of $2,500 or $775 (for at least a predefined period or until income curtailment ends, as previously discussed with regard to FIGS. 9-10). Accordingly, the BP entity will cover the remaining portion ($525) on the loan (i.e., $1,300−775=$525). Thus, the borrower is responsible for $775 as opposed to the original required $1300 due to income curtailment since the BP entity will cover $525 on behalf of the borrower. This is a payment reduction of 40.4% for the borrower while the borrower's income remains reduced to $2,500.

As previously mentioned, the borrower need not have to pay the full reduced amount ($B) during income curtailment, but may instead only pay a portion ($C) of the new reduced amount ($B) that the investor will accept to avoid proceedings in which a secured party has executed on collateral due to nonpayment. This situation is exemplified in FIG. 16C. FIG. 16C is similar to FIG. 16B, except that instead of the borrower paying the full reduced amount of $775, the borrower pays $600 in which will result in a total payment to the servicer/investor of $1125 (=$525+600). This is an amount that is agreed on by the investor and the borrower to avoid proceedings in which a secured party has executed on collateral due to nonpayment even though the borrower has not paid the full $1,300 payment.

FIGS. 15 and 16A-C only illustrate some embodiments of calculating the portion of payment that the BP entity would make on behalf of the borrower under income curtailment. It should be understood that the determinations of when the BP entity will make such payments and how much the BP entity will pay on behalf of the borrower during income curtailment should not be limited to the above-disclosed process 1500 of FIG. 15 or the exemplary Income Curtailment Benefit Calculators of FIGS. 16A-C.

For instance, as illustrated in FIG. 16D, instead of basing the payments on FER, the payments could be proportionally based on the percentage of income reduction. Under this example, if the borrower's income was reduced 50% (e.g., $5000 to $2500), then the payments that the BP entity would cover on behalf of the borrower could be 50% of the borrower's periodic loan payments. Accordingly, instead of the borrower having to pay $1,300 on the loan/mortgage per period, the borrower would only need to pay 50% of that amount (or $650) since the BP entity would pay the other 50% (e.g., $650). Other embodiments of income curtailment and calculating the amount of payment that a BP entity covers on behalf of the borrower are well within the scope of the present invention and the present invention is not limited to the above-described embodiments.

The terminology used herein is for the purpose of describing particular embodiments only and is not intended to be limiting of the invention, unless the context clearly indicates otherwise. As used herein, the singular forms "a", "an" and "the" are intended to include the plural forms as well, unless the context clearly indicates otherwise. It will be further understood that the terms "comprises," "includes," "including" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function. In one embodiment, a processor is a microprocessor that includes electrical hardware components.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
   a processor configured to receive information to enroll a borrower into a prevention and protection plan for a proceeding in which a secured party has executed on collateral due to nonpayment associated with a secured loan, wherein the secured loan comprises a loan that is secured with property owned by a borrower;
   a memory device configured to store terms of the prevention and protection plan in response to enrolling the borrower in the prevention and protection plan; and
   a module operable on the processor to:
      identify the occurrence of a covered event;
      in response to the occurrence of the covered event provide monetary and non-monetary assistance to the borrower to assist the borrower to meet loan payment obligations of the borrower, wherein the assistance is provided for a period spanning from the covered event occurring to occurrence of the proceeding in which the secured party has executed on collateral due to nonpayment;
      determine that the proceeding in which the secured party has executed on collateral due to nonpayment or a secured property loss event has occurred;
      engage a first prevention and protection (PP) entity to cancel at least a portion of the secured loan on behalf of the borrower in response to the proceeding in which the secured party has executed on collateral due to nonpayment or secured property loss event occurring so that the at least a portion of the loan payment is no longer owed; and
      engage a second PP entity to pay at least a portion of the remaining loan payment obligations of the borrower on the secured loan to an investor of the secured loan in response to the proceeding in which the secured party has executed on collateral due to nonpayment or secured property loss event occurring, wherein each of the first PP entity and the second PP entity are separate from the investor.

2. The apparatus of claim 1, wherein the processor is further configured for receiving information associated with a covering payment from the first PP entity on behalf of the borrower in response to the covered event occurring and remitting at least a portion of the covering payment to the investor, the investor being the secured party on the secured loan.

3. The apparatus of claim 1, wherein the secured loan comprises a mortgage that is secured by real estate owned by the borrower.

4. The apparatus of claim 1, wherein the processor is further configured to receive information related to a periodic payment from the borrower to a servicer.

5. A method comprising:
   offering to a borrower a prevention and protection plan for a proceeding in which a secured party has executed on collateral due to nonpayment associated with a secured loan, wherein the secured loan comprises a loan that is secured with property owned by a borrower;
   storing, in a memory device, the terms of the prevention and protection plan in response to the borrower accepting the prevention and protection plan; and identifying the occurrence of a covered event,
  in response to the occurrence of the covered event providing monetary and non-monetary assistance to the borrower to assist the borrower to meet loan payment obligations of the borrower, wherein the assistance is provided for a period spanning from the covered event occurring to occurrence of the proceeding in which the secured party has executed on collateral due to nonpayment;
  engaging a first prevention and protection (PP) entity to cancel at least a portion of the secured loan on behalf of the borrower in response to the proceeding in which the secured party has executed on collateral due to nonpayment or secured property loss event occurring so that the at least a portion of the loan payment is no longer owed; and
  engaging a second PP entity to pay at least a portion of the remaining loan payment obligations of the borrower on the secured loan to an investor of the secured loan in response to the proceeding in which the secured party has executed on collateral due to nonpayment or secured property loss event occurring, wherein each of the first PP entity and the second PP entity are separate from the investor.

6. The method of claim 5, further comprising, in response to the covered event occurring, performing one of:
  receiving information related to a covering payment made from the first PP entity on behalf of the borrower and information related to remitting at least a portion of the covering payment to the investor, the investor being the secured party on the secured loan; or
  cancelling at least a portion of the loan payment required by the secured loan.

7. The method of claim 5, further comprising transmitting at least a portion of a periodic payment to the first PP entity in exchange for prevention for the proceeding in which the secured party has executed on collateral due to nonpayment.

8. The method of claim 5, further comprising generating an alert to remit at least a portion of the loan payment to the investor in response to receiving a periodic payment from the borrower.

9. The method of claim 5, further comprising receiving, by a processor, information related to a periodic payment from the borrower to a servicer for the prevention and protection plan.

10. The method of claim 5, wherein the first PP entity comprises a borrower's protection (BP) entity and the second PP entity comprises an investor protection (IP) entity.

11. The method of claim 10, wherein the BP entity receives a monthly payment in exchange for prevention of the proceeding in which the secured party has executed on the collateral in response to nonpayment and the BP entity performs the covering at least a portion of a periodic payment required by the secured loan on behalf of the borrower in response to the covered event occurring in order to prevent the borrower losing the property.

12. The method of claim 10, wherein the IP entity pays the investor a least a portion remaining on the secured loan in the event of failure to meet the terms on the secured loan by the borrower.

13. The method of claim 5, wherein the covered event comprises one of income curtailment of the borrower, disability of the borrower, involuntary loss of employment of the borrower, hospitalization of the borrower or accidental death of the borrower.

14. The method of claim 5, wherein the borrower pays at least a portion of the loan payment to the investor on the secured loan and the first PP entity covers another portion of the loan payment to the investor in response to the covered event occurring.

15. The method of claim 14, wherein the portion of the loan payment the borrower is to pay is calculated based on at least one particular of the covered event to the borrower.

16. A computer implemented method comprising:
  enrolling, by a processor, a borrower into a prevention and protection plan for a proceeding in which a secured party has executed on collateral due to nonpayment associated with a secured loan, wherein the secured loan comprises a loan that is secured with property owned by a borrower; and
  storing, by a processor, terms of the prevention and protection plan;
  determining, by a processor, when a covered event occurs;
  instructing, by a processor, a first prevention and protection (PP) entity to provide monetary and non-monetary assistance to the borrower to assist the borrower to meet loan payment obligations of the borrower, wherein the assistance is provided for a period spanning from the covered event occurring to the proceeding in which the secured party has executed on collateral due to nonpayment;
  instructing, by a processor, the first PP entity to cancel at least a portion of the secured loan on behalf of the borrower in response to the proceeding in which the secured party has executed on collateral due to nonpayment or secured property loss so that the at least a portion of the loan payment is no longer owed; and
  instructing, by a processor, a second PP entity to pay at least a portion of the remaining loan payment obligations of the borrower on the secured loan to an investor of the secured loan in response to the proceeding in which the secured party has executed on collateral due to nonpayment or secured property loss event occurring, wherein each of the first PP entity and the second PP entity are separate from the investor.

17. The method of claim 16, further comprising receiving, by a processor, information related to a periodic payment from the borrower to a servicer for the prevention and protection plan.

18. The method of claim 16, further comprising storing information associated with at least a portion of a loan payment for the secured loan being covered by the first PP entity on behalf of the borrower in response to a covered event occurring.

19. The method of claim 16, further comprising storing information regarding whether a covered event has occurred.

20. The method of claim 16, wherein the terms further comprise terms regarding payment or debt cancellation on debt remaining to a secured party on the secured loan in response to the borrower losing the property after the covering of at least a portion of the secured loan on behalf of the borrower has ceased.

21. The method of claim 16, wherein the covered event comprises an event that adversely affects disposable income of the borrower so that the borrower has a difficult time to make the loan payment.

22. The method of claim 21, wherein the covered event comprises one of income curtailment, disability of the borrower, involuntary loss of employment, hospitalization or accidental death.

23. The method of claim 16, wherein the terms further comprise terms regarding collecting a periodic fee for the prevention and protection plan.

24. The method of claim 16, further comprising providing a quote for the prevention and protection plan via an interactive web site of a service provider to enter the selected information related to the borrower and the secured loan.

25. The method of claim 16, wherein the secured loan comprises a mortgage that is secured by real estate owned by the borrower.

26. A computer program product comprising non-transitory computer readable medium, wherein the non-transitory computer readable medium comprises computer-executable program code stored therein, the computer-executable program code comprising:
- computer-executable program code configured to receive information to enroll a borrower into a prevention and protection plan for a proceeding in which a secured party has executed on collateral due to nonpayment associated with a secured loan, wherein the secured loan comprises a loan that is secured with property owned by a borrower;
- computer-executable program code configured to store terms of the prevention and protection plan in response to enrolling the borrower in the prevention and protection plan;
- computer-executable program code configured to identify the occurrence of a covered event;
- computer-executable program code configured to, in response to the occurrence of the covered event provide monetary and non-monetary assistance to the borrower to assist the borrower to meet loan payment obligations of the borrower, wherein the assistance is provided for a period spanning from the covered event occurring to occurrence of the proceeding in which the secured party has executed on collateral due to nonpayment;
- computer-executable program code configured to engage a first prevention and protection (PP) entity to cancel at least a portion of the secured loan entity on behalf of the borrower in response to the proceeding in which the secured party has executed on collateral due to nonpayment or secured property loss event occurring so that the at least a portion of the loan payment is no longer owed; and
- computer-executable program code configured to engage a second PP entity to pay at least a portion of the remaining loan payment obligations of the borrower on the secured loan to an investor of the secured loan in response to the proceeding in which the secured party has executed on collateral due to nonpayment or secured property loss event occurring, wherein each of the first PP entity and the second PP entity are separate from the investor.

27. The computer program product of claim 26, further comprising computer-executable program code configured to determine if at least a portion of a loan payment for the secured loan should be covered by the first PP entity on behalf of the borrower in response to the covered event occurring.

* * * * *